(12) United States Patent
Chen et al.

(10) Patent No.: US 11,758,421 B2
(45) Date of Patent: Sep. 12, 2023

(54) SELF-ORGANIZING NETWORK CONCEPTS FOR SMALL CELLS BACKHAULING

(71) Applicant: Nokia Solutions and Networks Oy, Espoo (FI)

(72) Inventors: David Chen, Wilmette, IL (US); Pekka Juhani Wainio, Kauniainen (FI); Kari Seppanen, Espoo (FI); Tapio Suihko, Espoo (FI); Jorma Kilpi, Helsinki (FI); Jori Paananen, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/566,462

(22) PCT Filed: Apr. 15, 2016

(86) PCT No.: PCT/US2016/027762
§ 371 (c)(1),
(2) Date: Oct. 13, 2017

(87) PCT Pub. No.: WO2016/168603
PCT Pub. Date: Oct. 20, 2016

(65) Prior Publication Data
US 2018/0302807 A1    Oct. 18, 2018

Related U.S. Application Data

(60) Provisional application No. 62/147,921, filed on Apr. 15, 2015.

(51) Int. Cl.
*H04W 24/04* (2009.01)
*H04W 28/02* (2009.01)
(Continued)

(52) U.S. Cl.
CPC .............. *H04W 24/04* (2013.01); *H04L 41/12* (2013.01); *H04L 45/22* (2013.01); *H04L 45/28* (2013.01);
(Continued)

(58) Field of Classification Search
None
See application file for complete search history.

(56) References Cited

U.S. PATENT DOCUMENTS 9,030,962 B2 *  5/2015  Saleh .................... H04L 41/122
                                                   370/254
2003/0193959 A1 * 10/2003  Lui ....................... H04L 12/462
                                                   370/401

(Continued)

FOREIGN PATENT DOCUMENTS

| CN | 101449524 A | 6/2009 |
| CN | 101682535 A | 3/2010 |

(Continued)

OTHER PUBLICATIONS

Supreeth Herle, Topology Management for Wireless Mesh Self-Organizing Mobile Backhauls, Master's Thesis submitted in partial fulfillment of the degree of Master of Science in Technology; Topology Management for Wireless Mesh Self-Organizing Mobile Backhauls: Supreeth Herle, Mar. 3, 2015. Internet: <https://aaltodoc.aalto.fi/bitstream/handle/123456789/15627/master_Herle_Supreeth_2015.pdf?sequence=1>.

(Continued)

*Primary Examiner* — Steve R Young
(74) *Attorney, Agent, or Firm* — Nokia Solutions and Networks Oy

(57) ABSTRACT

A mesh network includes domain(s) of multiple nodes interconnected through links and in which there are gateway(s) connecting a domain to another network. The domain(s), (Continued)

their multiple nodes, and their links are part of a topology. A set of primary and backup routing paths, each including an ST that includes the selected gateway and route to that selected gateway for nodes in the domain, for a selected one of the gateway(s) is accessed or determined. Schedule(s) to be used by node(s) in the mesh network over one or more scheduling cycles are accessed or determined. Based on status of link(s) between nodes and on the schedule(s), switching is performed to a selected one of the primary or backup routing paths for the selected gateway. Routing in the mesh network is caused to be modified based on the selected routing path. Information is sent to nodes for the paths and schedules.

20 Claims, 20 Drawing Sheets

(51) Int. Cl.
| | |
|---|---|
| *H04W 28/08* | (2023.01) |
| *H04W 28/26* | (2009.01) |
| *H04W 40/22* | (2009.01) |
| *H04W 40/24* | (2009.01) |
| *H04W 72/12* | (2023.01) |
| *H04L 12/753* | (2013.01) |
| *H04L 45/48* | (2022.01) |
| *H04L 41/12* | (2022.01) |
| *H04L 45/28* | (2022.01) |
| *H04L 45/00* | (2022.01) |
| *H04W 72/1263* | (2023.01) |
| *H04W 40/10* | (2009.01) |
| *H04L 45/18* | (2022.01) |
| *H04W 84/04* | (2009.01) |
| *H04W 84/18* | (2009.01) |
| *H04W 88/16* | (2009.01) |

(52) U.S. Cl.
CPC .......... *H04L 45/48* (2013.01); *H04W 28/021* (2013.01); *H04W 28/0268* (2013.01); *H04W 28/0942* (2020.05); *H04W 28/26* (2013.01); *H04W 40/22* (2013.01); *H04W 40/248* (2013.01); *H04W 72/1263* (2013.01); *H04L 45/18* (2013.01); *H04L 2212/00* (2013.01); *H04W 40/10* (2013.01); *H04W 84/045* (2013.01); *H04W 84/18* (2013.01); *H04W 88/16* (2013.01); *Y02D 30/70* (2020.08)

(56) References Cited

U.S. PATENT DOCUMENTS

| | | | | |
|---|---|---|---|---|
| 2006/0268749 | A1* | 11/2006 | Rahman | H04L 45/02 370/256 |
| 2007/0206616 | A1 | 9/2007 | Orth | 370/401 |
| 2008/0130489 | A1* | 6/2008 | Chao | H04L 45/28 370/219 |
| 2008/0279155 | A1 | 11/2008 | Pratt, Jr. et al. | 370/336 |
| 2008/0310343 | A1* | 12/2008 | Balachandran | H04W 40/02 370/328 |
| 2009/0285165 | A1 | 11/2009 | Berglund et al. | 370/329 |
| 2011/0164527 | A1* | 7/2011 | Mishra | H04L 45/123 370/252 |
| 2012/0303788 | A1* | 11/2012 | Heinrich | H04W 72/1257 709/223 |
| 2013/0073711 | A1* | 3/2013 | Hanka | H04L 49/552 709/223 |
| 2013/0114598 | A1* | 5/2013 | Schrum | H04L 45/22 370/392 |
| 2013/0151888 | A1* | 6/2013 | Bhattiprolu | G06F 11/2007 714/6.3 |
| 2015/0138977 | A1* | 5/2015 | Dacosta | H04W 84/18 370/235 |
| 2015/0230105 | A1* | 8/2015 | Negus | H04B 7/0408 370/329 |
| 2015/0304879 | A1* | 10/2015 | Dacosta | H04W 4/14 370/235 |
| 2019/0036801 | A1* | 1/2019 | Natarajan | H04L 67/12 |

FOREIGN PATENT DOCUMENTS

| | | |
|---|---|---|
| CN | 102027795 A | 4/2011 |
| CN | 104244423 A | 12/2014 |

OTHER PUBLICATIONS

Mastering TCP/IP Network Design Edition, Sep. 25, 2003, first edition, pp. 87-103, 175-225, 377-412 (Japanese magazine).

* cited by examiner

| 19 Links on Primary Path ||
|---|---|
| $L_{1,2}$ | $L_{1,3}$ |
| $L_{1,14}$ | $L_{2,4}$ |
| $L_{2,6}$ | $L_{2,15}$ |
| $L_{3,5}$ | $L_{3,12}$ |
| $L_{3,16}$ | $L_{14,10}$ |
| $L_{14,11}$ | $L_{14,18}$ |
| $L_{4,7}$ | $L_{6,8}$ |
| $L_{15,19}$ | $L_{5,13}$ |
| $L_{10,17}$ | $L_{11,9}$ |
| $L_{18,20}$ | |

| Field | Purpose |
|---|---|
| WNID | Destination WN ID |
| STID | Spanning tree ID |
| VCID | Flow ID |
| PRIO | Flow priority |
| RRCTR | Re-route counter |
| SEQ | Sequence number (optional) |

FIG 14

|  | $T_1$ | $T_2$ | $T_3$ | $T_4$ | $T_5$ |
|---|---|---|---|---|---|
| $T_1$ | 31 | 1 | 3 | 2 | 23 |
| $T_2$ | 1 | 30 | 2 | 3 | 1 |
| $T_3$ | 3 | 2 | 30 | 2 | 4 |
| $T_4$ | 2 | 3 | 2 | 29 | 2 |
| $T_5$ | 23 | 1 | 4 | 2 | 30 |

```
1:  function GENSTEMS (V, E, allroots)
2:      F ← ∅
3:      for v ∈ allroots do
4:          H ← emptyheap
5:          A ← allroots
6:          for u ∈ V, e(v, u) ∈ E do
7:              T ← mdst(v, u)
8:              F ← F ∪ {T}
9:              H.insert(heapitem(u, v, T))
10:         end for
11:         GROW (V, E, H, A)
12:     end for
13:     return F
14: end function
```

```
1: procedure GROW (V, E, H, A)
2:     while H ≠ ∅ do
3:         n ← H.remove()
4:         if n.id ∉ A then
5:             n.T.add(n.id, n.parent)
6:             A ← A ∪ {n.id}
7:             if continue(n.id, n.T) then
8:                 for u ∈ V, e(u, n.id) ∈ E do 9:                     if u ∉ A then
10:                        H.insert(heapitem(u, n.id, n.T))
11:                    end if
12:                end for
13:            end if
14:        end if
15:    end while
16: end procedure
```

```
1:  procedure GENTREE (V, E, T)
2:      H ← emptyheap
3:      A ← nodelist(T)
4:      for v ∈ T do
5:          for u ∈ V, e(v, u) ∈ E do
6:              if u ∉ A then
7:                  H.insert(heapitem(u, v, T))
8:              end if
9:          end for
10:     end for
11:     GROW (V, E, H, A)
12: end procedure
```

1: procedure TAILOPT(V, E, T)
2:     for $v \in T$, T.isLeaf(v)=True do
3:         for $u \in T$, $e(u, v) \in E \cap T$ do
4:             if $|path(r, u)| + 1 < |path(r, v)|$ then
5:                 T.moveLeaf(v, u)
6:             end if
7:         end for
8:     end for
9: end procedure

FIG 24

2410: In a mesh network comprising one or more domains of multiple nodes interconnected through links and in which there is at least one gateway in a selected domain connecting the selected domain to another network, wherein the one or more domains and their multiple nodes and their links are part of a topology, accessing a set of primary and backup routing paths for a selected one of the a least one gateways, wherein each primary and backup routing path for the selected gateway comprises a spanning tree that comprises the selected gateway and route to that selected gateway for nodes in the selected domain

2420: Accessing one or more schedules to be used by one or more of the nodes in the mesh network over one or more scheduling cycles

2430: Switching, based on status of one or more of the links between nodes and on the one or more schedules, to a selected one of the primary or backup routing paths for the selected gateway

2440: Causing routing in at least part of the mesh network to be modified based on the selected routing path

FIG 25

2510: In a mesh network comprising one or more domains of multiple nodes interconnected through links, wherein the one or more domains and their multiple nodes and their links are part of a topology, and wherein there is at least one gateway for a selected domain that connects the selected domain to another network, determining a set of primary and backup routing paths for a selected one of the at least one gateways, wherein each primary and backup routing path for the selected gateway comprises a spanning tree that comprises the selected gateway and route to that selected gateway for nodes in the selected domain

2520: Performing the determining the set of primary and backup routing paths for any other gateways in the selected domain

2530: Determining one or more schedules to be used by the nodes in the mesh network over one or more scheduling cycles

2540: Sending information to the nodes in the mesh network, wherein the information for a node describes at least the primary and backup routing paths for the nodes and the one or more schedules for the nodes for the selected domain

SELF-ORGANIZING NETWORK CONCEPTS FOR SMALL CELLS BACKHAULING

TECHNICAL FIELD

This invention relates generally to wireless communications and, more specifically, relates to self-organizing networks in wireless communications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Mobile broadband traffic is expected to grow a thousand-fold by 2020. The next generation ubiquitous, ultra-high-bandwidth communication system, also known as 5G, will involve network densification to meet the throughput and latency demands that are likely to arise in 2020 and beyond. By 2020, small cells are expected to carry the majority of traffic with overall data volume expected to grow up to 1,000 times (compared to 2010) and will be 10,000 fold by 2030.

Consequently, small cell deployment will become one of the biggest challenges for mobile operators due to the order of magnitude more sites than in the traditional macro cell deployment. This is especially true for outdoor deployments. The last hop backhaul for 5G small cells must enable a cost-effective deployment in a flexible, organic way, where additional capacity can be injected as required. The backhaul has to meet all the key 5G backhaul requirements such as providing multi-gigabit throughput, having millisecond level of maximum latency, having high availability and reliability, having cost-effective scalability, being easy to deploy, being easy to manage, having dynamic expandability and optimization based on traffic, having a small form factor, and having low TCO (Total Cost of Ownership).

These kinds of requirements call for special solutions for 5G last-mile backhauling. Further, the increased number of cells raises the network complexity. This in turn increases the difficulty of planning, controlling and optimizing the network operations for an operator in a cost-effective manner. In fact, it is expected that future 5G small cell networks will be deployed incrementally without detailed network planning. The concept of Self-Organizing Network (SON) is viewed as a viable technology by operators to minimize the operating cost and effort by automating the network design, deployment and operating phases.

On the other hand, the use of mesh networks for connectivity between the 5G small cells will provide by nature increased reliability and flexibility via the alternative routes in the mesh topology. However, it is currently not clear as to how using mesh networks and other techniques for 5G small cells can meet 5G operators' high expectations.

BRIEF SUMMARY

This section is intended to include examples and is not intended to be limiting.

In an exemplary embodiment, a method comprises, in a mesh network comprising one or more domains of multiple nodes interconnected through links and in which there is at least one gateway in a selected domain connecting the selected domain to another network, wherein the one or more domains and their multiple nodes and their links are part of a topology, accessing a set of primary and backup muting paths for a selected one of the at least one gateways. Each primary and backup routing path for the selected gateway comprises a spanning tree that comprises the selected gateway and route to that selected gateway for nodes in the selected domain. The method includes accessing one or more schedules to be used by one or more of the nodes in the mesh network over one or more scheduling cycles. The method also includes switching, based on status of one or more of the links between nodes and on the one or more schedules, to a selected one of the primary or backup routing paths for the selected gateway. The method includes causing routing in at least part of the mesh network to be modified based on the selected routing path.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

A further example of an embodiment is an apparatus, comprising: means, in a mesh network comprising one or more domains of multiple nodes interconnected through links and in which there is at least one gateway in a selected domain connecting the selected domain to another network, wherein the one or more domains and their multiple nodes and their links are part of a topology, for accessing a set of primary and backup routing paths for a selected one of the at least one gateways, wherein each primary and backup routing path for the selected gateway comprises a spanning tree that comprises the selected gateway and route to that selected gateway for nodes in the selected domain; means for accessing one or more schedules to be used by one or more of the nodes in the mesh network over one or more scheduling cycles; means for switching, based on status of one or more of the links between nodes and on the one or more schedules, to a selected one of the primary or backup routing paths for the selected gateway, and means for causing routing in at least part of the mesh network to be modified based on the selected routing path.

An example of an apparatus includes one or more processors and one or more memories including computer program code. The one or more memories and the computer program code are configured to, with the one or more processors, cause the apparatus to perform at least the following: in a mesh network comprising one or more domains of multiple nodes interconnected through links and in which there is at least one gateway in a selected domain connecting the selected domain to another network, wherein the one or more domains and their multiple nodes and their links are part of a topology, accessing a set of primary and backup routing paths for a selected one of the at least one gateways, wherein each primary and backup routing path for the selected gateway comprises a spanning tree that comprises the selected gateway and route to that selected gateway for nodes in the selected domain; accessing one or more schedules to be used by one or more of the nodes in the mesh network over one or more scheduling cycles; switching, based on status of one or more of the links between nodes and on the one or more schedules, to a selected one of the primary or backup routing paths for the selected gateway; and causing routing in at least part of the mesh network to be modified based on the selected routing path.

An example of a computer program product includes a computer-readable storage medium bearing computer program code embodied therein for use with a computer. The computer program code includes: code, in a mesh network comprising one or more domains of multiple nodes interconnected through links and in which there is at least one gateway in a selected domain connecting the selected domain to another network, wherein the one or more domains and their multiple nodes and their links are part of a topology, for accessing a set of primary and backup routing paths for a selected one of the at least one gateways, wherein each primary and backup routing path for the selected gateway comprises a spanning tree that comprises the selected gateway and route to that selected gateway for nodes in the selected domain; code for accessing one or more schedules to be used by one or more of the nodes in the mesh network over one or more scheduling cycles; code for switching, based on status of one or more of the links between nodes and on the one or more schedules, to a selected one of the primary or backup routing paths for the selected gateway, and code for causing routing in at least part of the mesh network to be modified based on the selected routing path.

Another example of a method includes: in a mesh network comprising one or more domains of multiple nodes interconnected through links, wherein the one or more domains and their multiple nodes and their links are part of a topology, and wherein there is at least one gateway for a selected domain that connects the selected domain to another network, determining a set of primary and backup muting paths for a selected one of the at least one gateways, wherein each primary and backup routing path for the selected gateway comprises a spanning tree that comprises the selected gateway and route to that selected gateway for nodes in the selected domain; performing the determining the set of primary and backup muting paths for any other gateways in the selected domain; determining one or more schedules to be used by the nodes in the mesh network over one or more scheduling cycles; and sending information to the nodes in the mesh network, wherein the information for a node describes at least the primary and backup routing paths for the nodes and the one or more schedules for the nodes for the selected domain An additional embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

A further example is an apparatus, comprising, means, in a mesh network comprising one or more domains of multiple nodes interconnected through links, wherein the one or more domains and their multiple nodes and their links are part of a topology, and wherein there is at least one gateway for a selected domain that connects the selected domain to another network, for determining a set of primary and backup routing paths for a selected one of the at least one gateways, wherein each primary and backup routing path for the selected gateway comprises a spanning tree that comprises the selected gateway and route to that selected gateway for nodes in the selected domain; means for performing the determining the set of primary and backup routing paths for any other gateways in the selected domain; means for determining one or more schedules to be used by the nodes in the mesh network over one or more scheduling cycles; and means for sending information to the nodes in the mesh network, wherein the information for a node describes at least the primary and backup routing paths for the nodes and the one or more schedules for the nodes for the selected domain.

An example of an apparatus includes one or more processors and one or more memories including computer program code. The one or more memories and the computer program code are configured to, with the one or more processors, cause the apparatus to perform at least the following: in a mesh network comprising one or more domains of multiple nodes interconnected through links, wherein the one or more domains and their multiple nodes and their links are part of a topology, and wherein there is at least one gateway for a selected domain that connects the selected domain to another network, determining a set of primary and backup routing paths for a selected one of the at least one gateways, wherein each primary and backup routing path for the selected gateway comprises a spanning tree that comprises the selected gateway and route to that selected gateway for nodes in the selected domain; performing the determining the set of primary and backup muting paths for any other gateways in the selected domain; determining one or more schedules to be used by the nodes in the mesh network over one or more scheduling cycles; and sending information to the nodes in the mesh network, wherein the information for a node describes at least the primary and backup routing paths for the nodes and the one or more schedules for the nodes for the selected domain.

An example of a computer program product includes a computer-readable storage medium bearing computer program code embodied therein for use with a computer. The computer program code includes: code, in a mesh network comprising one or more domains of multiple nodes interconnected through links, wherein the one or more domains and their multiple nodes and their links are part of a topology, and wherein there is at least one gateway for a selected domain that connects the selected domain to another network, for determining a set of primary and backup routing paths for a selected one of the at least one gateways, wherein each primary and backup routing path for the selected gateway comprises a spanning tree that comprises the selected gateway and route to that selected gateway for nodes in the selected domain; code for performing the determining the set of primary and backup routing paths for any other gateways in the selected domain; code for determining one or more schedules to be used by the nodes in the mesh network over one or more scheduling cycles; and code for sending information to the nodes in the mesh network, wherein the information for a node describes at least the primary and backup routing paths for the nodes and the one or more schedules for the nodes for the selected domain.

BRIEF DESCRIPTION OF THE DRAWINGS

In the attached Drawing Figures:

FIG. 6 is a table of WMN frame header fields;

FIG. 14 is a matrix of transmission sets link overlap counts.

FIGS. 24 and 25 are logic flow diagrams for performing self-organizing network concepts for small cells backhauling, and illustrate the operation of an exemplary method, a result of execution of computer program instructions embodied on a computer readable memory, functions performed by logic implemented in hardware, and/or interconnected means for performing functions in accordance with examples of embodiments.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, the use of mesh networks for connectivity between the 5G small cells will provide by nature increased reliability and flexibility via the alternative routes in the mesh topology, but it is not clear how such implementation might take place to meet criteria for 5G operators. Here, we disclose innovative wireless backhaul solutions for, e.g., 5G small cells that can meet 5G operators' high expectations. A concept of self-organizing and self-optimizing small cell wireless mesh backhaul solutions referred to as Self-optimizing Wireless Mesh Networks is disclosed herein, e.g., with special built-in features characterizing its innovative nature. Additional description of these techniques is presented after a system into which certain examples of embodiments may possibly be used is described.

Figure 1:
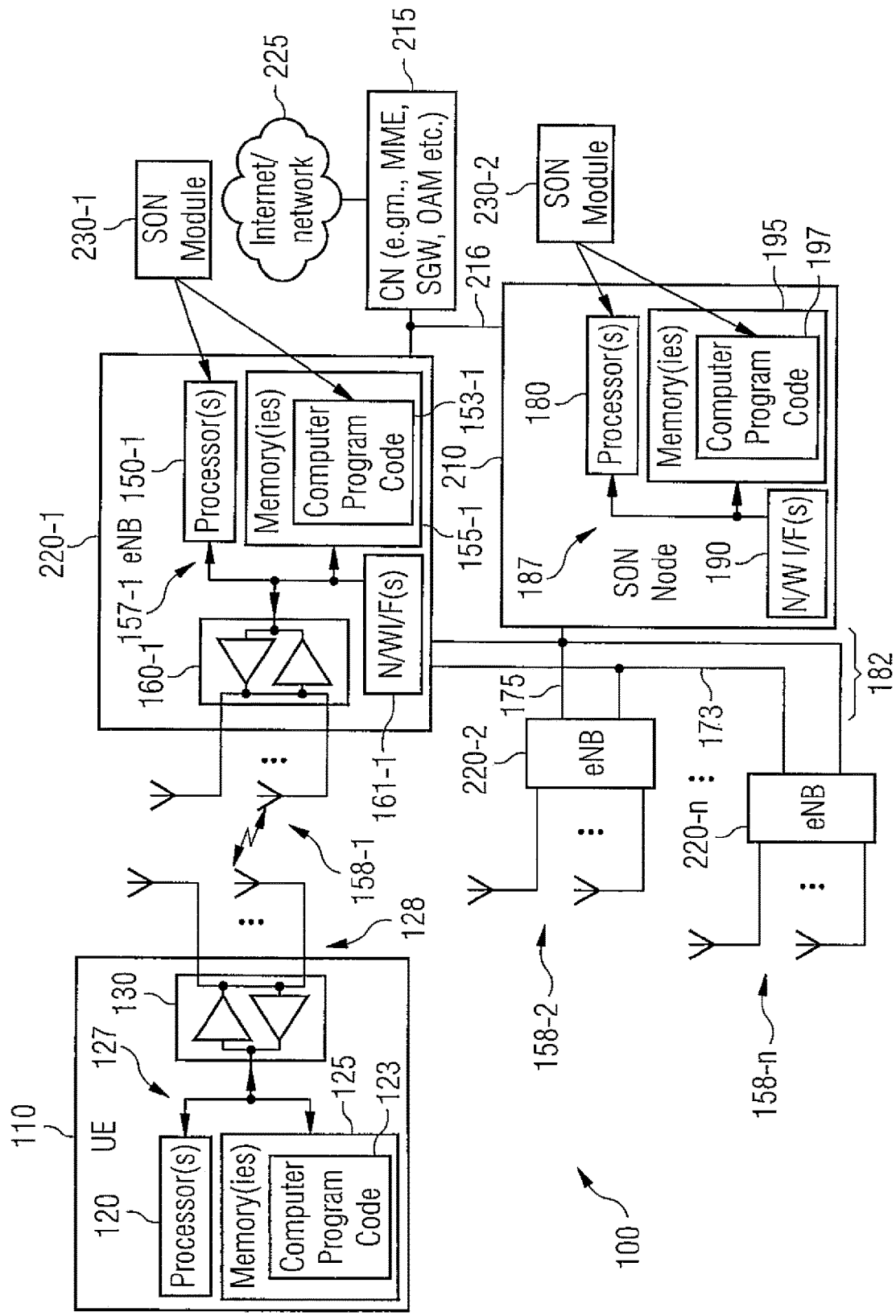
FIG. 1 is a block diagram of one possible and non-limiting example of a system in which certain embodiments may be practiced.

FIG. 1 illustrates an example system in which certain examples of embodiments of the instant invention may be practiced. In FIG. 1, a user equipment (UE) 110 is in wireless communication with a radio network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The radio network 100 includes n eNodeBs (eNBs) 220-1, 220-2, and 220-n and may include SON (self-organizing network) node 210. The internal elements of eNodeB 220-1 will be described herein, and it is assumed the eNodeBs 220-2 and 220-n are similar. The eNodeB 220-1 includes one or more processors 150-1, one or more memories 155-1, one or more network interfaces (N/W I/F(s)) 161-1, and one or more transceivers 160-1 interconnected through one or more buses 157-1. The one or more transceivers 160-1 are connected to one or more antennas 158-1. The one or more memories 155-1 include computer program code 153-1. In an example of an embodiment, the one or more memories 155-1 and the computer program code 153-1 are configured to, with the one or more processors 150-1, cause the eNodeB 220-1 to perform one or more of the operations as described herein. In an example, for instance, the SON module 230-1 can be implemented (for instance, as means for performing functions) to perform some, many, or all of the functions described herein and may be implemented in hardware (e.g., as part of processor(s) 150-1, such as in a gate array or semiconductor circuit) or as part of the computer program code 153-1, or some combination of hardware or computer program code 153-1. The one or more network interfaces 161-1 communicate over networks such as the networks 173, 175. In an example, one or both of the networks 173, 175 are considered to be backhaul links 182.

The SON node 210 includes one or more processors 180, one or more memories 195, and one or more network interfaces (N/W I/F(s)) 190 interconnected through one or more buses 187. The one or more memories 195 include computer program code 197. In an example, the one or more memories 195 and the computer program code 197 are configured to, with the one or more processors 180, cause the SON node 210 to perform one or more of the operations as described herein. In an example, for instance, the SON module 230-2 can be implemented (for instance, as means for performing functions) to perform some, many, or all of the functions described herein (e.g., and in the Exhibits), and may be implemented in hardware (e.g., as part of processor (s) 180, such as in a gate array or semiconductor circuit) or as part of the computer program code 180, or some combination of hardware or computer program code 180. The SON node 210 is optional but may be used in a centralized implementation for one or more of the actions described herein. The one or more network interfaces 190 communicate over networks such as the networks 173, 175.

The eNodeBs 220 communicate using, e.g., network 173, which is part of backhaul link(s) 182. The network 173 may be wired or wireless or both and may implement, e.g., an X2 interface. The SON node 210 uses the network 175 to communicate with the eNodeBs 220. The network 175 may be wired or wireless or both.

The eNB 220-1 may be a macro eNB providing gateway (GW) services to the other (e.g., small cell) eNBs 220-2 through 220-n. As described below there may be multiple eNBs 220 providing GW services to sets of other (e.g., subordinate) eNBs 220, such that the network 100 is partitioned into sub-networks. It is noted that there is typically a core network (CN) 215 to which the eNBs 220 and/or SON node(s) 210 would be connected, e.g., via one or more links 216. The CN 215 may contain many different elements, of which an MME, SGW, and/or OAM are examples. The CN 215 may also connect to a network 225 such as the Internet.

The computer readable memories 155 and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150 and 180 may be of any type suitable to the local technical environment, and may include one or more of general purpose computers, special purpose computers, microprocessors, digital signal processors (DSPs) and processors based on a multi-core processor architecture, as non-limiting examples.

Having thus introduced one suitable but non-limiting technical context for the practice of certain examples of embodiments of this invention, additional introduction and description of the embodiments will now be described with greater specificity. For ease of reference, this disclosure is divided into sections.

Section 1. Introduction

In 5G networks, street level deployment of small cell access points and their transport solutions in, e.g., billboards, lamp posts, and other utility poles is assumed. The mmW radio technology provides the required capacity, bandwidth and latency performance for backhauling but requires line-of-sight connections. Thus the link performance can be affected by temporary obstacles, weather conditions, and mast sways. Electrical beam steering is used to cope with mast sways of lamp posts, and the like, but in addition a dynamic network level path recovery is needed to provide fast reconnection to alternative routes. 5G small cell backhauling solutions should provide fast restoration for network failures and link degradations. To reach the target level of network resiliency and reliability, microseconds level of protection switching and failure recovery is assumed. The same level of response time is also expected for load balancing and traffic optimization to effectively cope with the dynamic changes and fluctuations in user traffic. Since end-to-end performance from source to destination (e.g., from mobile user to application server in the core network and back) is considered, a network wide support for fast and dynamic reaction for network failures and traffic congestions is important.

Due to the sheer number of connected nodes, the 5G small cell backhaul network should be easy to deploy, manage and expand. Human management actions during network build and operate phases by operation personnel should be minimized to keep the OPEX and IMPEX cost down.

Wireless Mesh Networks (WMN) based on high capacity pencil-beam (e.g., quite narrow compared to other wavelengths) millimeter wave (mmW) links offer an attractive solution for small cell backhauling in 5G networks. By taking advantage of spatial TDMA, the network capacity can be utilized efficiently. However, it is challenging to develop link scheduling and routing mechanisms that can meet the 5G delay targets. Furthermore, routing and link scheduling are strongly interconnected but very difficult to optimize at the same time. The mesh routing techniques should also incorporate load balancing capabilities to provide fast adaptation to wireless link degradation and network traffic load fluctuation, which in a small-cell context can be significant.

Figure 2:
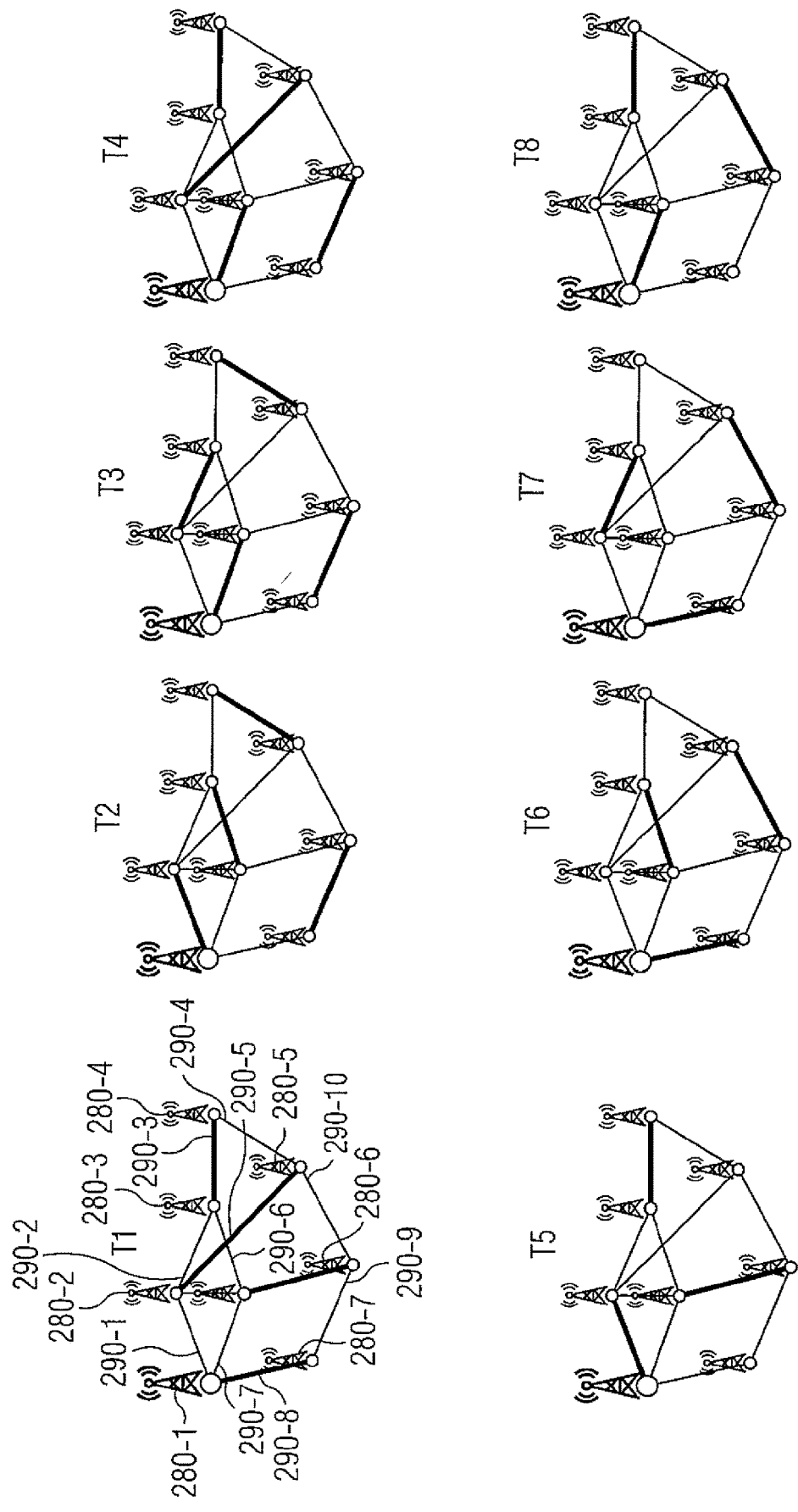
FIG. 2 is a WMN transmission set illustration, which illustrates a group of simultaneous disjoint links that can be active in a TDD fashion for each of eight transmission sets T1 through T8.

In a 5G small cell network where all small cell nodes are mesh-interconnected and each node is equipped with a sectorized narrow beam, beam-steering wireless backhaul radio that can only point to one neighboring node per antenna sector at a time, there is a need to identify and optimize a group of simultaneous transport links that can be active in order to maximize the network throughput. Referring to FIG. 2, this figure illustrates a WMN transmission set illustration, which illustrates a group of simultaneous disjoint links that can be active in a TDD fashion for each of eight transmission sets T1 through T8. The node 280-1 is a macro cell (e.g., having an eNB 220-1) and the nodes 280-2 through 280-7 are small cells (e.g., each having an eNB 220-2 through 220-7). There are 11 possible links 280 between the nodes 280. FIG. 2 illustrates the problem space of a wireless backhaul mesh-connected 5G small cell network when a node can communicate, in a TDD fashion, with only one neighbor at a given time (i.e., there is only one sector). This is to minimize the wireless backhauling cost per node as each node is equipped with a narrow-beam beam-steering wireless backhaul radio that can be steered toward one neighbor at one time. A macro cell 280-1 serves as a gateway (GW) for all the subordinate 5G small cells 280-2 through 280-7.

As shown in FIG. 2, we will call each group of simultaneous disjoint wireless backhaul links a transmission set. There are eight transmission sets (T1 to T8) illustrated in FIG. 2, as an example. An example schedule cycle could be (T1, T6, T8, T3, T2, M), where M is a monitoring slot to scan for new neighbors. For each transmission set, the following links are active: for T1, links 290-2, 290-3, 290-8, and 290-11; for T2, links 290-1, 290-4, 290-6, and 290-9; for T3, links 290-2, 2904, 290-7, and 290-9; for T4, links 290-3, 290-5, 290-7, and 290-9; for T5, links 290-1, 290-3, and 290-11; for T6, links 290-6, 290-8, and 290-10; for T7, links 290-3, 290-8, and 290-10; and for T8, links 290-3, 290-7, and 290-10.

In this disclosure, we propose an innovative networking concept optimized for 5G small cell backhauling with a tightly coupled routing and scheduling solution which maximizes the performance and efficiency of the wireless transport of such a 5G small cell network as illustrated, e.g., in FIG. 2. The proposed concepts may provide fast autonomous protection for network failures, dynamic load balancing to cope with user traffic fluctuations and is easy to deploy, manage and expand.

Section 2. Additional Introduction

The TDM-based transport techniques offer a basic and resilient transport service between base station sites and the core network for legacy mobile communication systems. However, these systems are extremely inflexible in terms of dynamic capacity allocation and access capacity and are not able to handle large asynchronous traffic volumes. Packet-based techniques in the backhaul portion are then inevitable due to their capacity flexibility, low cost and high manageability features. The most common packet-based backhauling technologies currently are Carrier Ethernet Transport, plain IP transport and IP/MPLS transport.

Carrier Ethernet is essentially a set of amendments to plain Ethernet in order to make Ethernet transport more suitable for large, complex and demanding operator network environments. The most common Carrier Ethernet technologies are Provider Bridging (PB), Provider Backbone Bridging (PBB) and Provider Backbone Bridging-Traffic Engineering (PBB-TE). Typically, Carrier Ethernet protocols need a spanning tree protocol to be run alongside to prevent looping and unnecessary broadcast storming. Also, Quality of Service (QoS) can be problematic in Carrier Ethernet but the situation has got better with PBB and PBB-TE. Resiliency in Carrier Ethernet solutions is largely dependent on the detection delay of error and the convergence time of the used spanning tree protocol. Typical values for combined detection and convergence are around one second with Rapid Spanning Tree Protocol and Ethernet OAM. This is several decades worse than the inherent requirement for future 5G networks as was noted in the previous section.

From 3G onwards, mobile communication systems have been supporting IP for fixed transport. IP can be used in conjunction with transport layer protocols TCP (Transmission Control Protocol), UDP (User Datagram Protocol) or SCTP (Stream Control Transmission Protocol). IP naturally requires a routing protocol to distribute the routing information. OSPF (Open Shortest Path First), IS-IS (Intermediate System to Intermediate System) and BGP (Border Gateway Protocol) can all be found in different backhaul networks. For Quality of Service, IP uses DiffServ (Differentiated Services) and IntServ (Integrated Services) schemes that control packet scheduling according to certain per-hop or per-domain target values. IP also offers some traffic engineering capabilities through its control protocols such as default routing and link weighting. Resiliency in IP networks is largely dependent on the error detection delay and the convergence time of the used routing protocol. Typical values for present routing protocols are a few seconds with IGPs (Interior Gateway Protocol) and a couple of tens of seconds with BGP, which are again unacceptable for 5G backhauling.

IP/MPLS is perhaps the most used operator core transport technology. MPLS is effectively a layer 2.5 protocol tagging incoming packets with a special shim header and subsequently switching labels in these shim headers across an MPLS cloud to form an MPLS tunnel MPLS tunnels can be created by using LDP (Label Distribution Protocol) which in turn needs a routing protocol for topology knowledge, entirely manually, or with a PCE (Path Computation Element) using RVSP-TE (Resource Reservation Protocol Traffic Engineering). For backhaul networks, IP/MPLS offers numerous connectivity services such as layer 3 and layer 2 VPNs (Virtual Private Network) which can be used, for example, for connecting a cluster of base stations with corresponding controllers over an aggregation network. MPLS also offers extensive traffic engineering capabilities in terms of tunnel creation and in-coming traffic handling. Quality of Service in MPLS (DS-TE) networks is handled with DiffServ. Resiliency in MPLS networks can be extremely good and convergence fast but can require manual configuration for best performance. Typical values are a couple of hundred milliseconds with MPLS path protection and around 50 milliseconds with MPLS FRR (Fast Reroute) whereas examples below can have values in microseconds without packet drops and without need for retransmission. Both MPLS methods require pre-configuration of protective paths or links. Another possibility is to use LDP which is more automated but only converges after the control plane routing protocols have converged after a link break whereas in our innovation, selection of protective path may be dynamic, on-demand and happen automatically without the need for allocating extra capacity for protection. Further, in MPLS-TP, GMPLS-based control plane may be used, which relies on RSVP-TE for LSP signaling.

In summary, routing solutions with traffic engineering features designed for wired networks are not directly applicable in static wireless mesh networks (SWMN). One of the reference standards for SWMN routing is Hybrid Wireless Mesh Protocol (HWMP), defined in IEEE 802.11s (see IEEE Standard for Information technology—Telecommunications and information exchange between systems Local and metropolitan area networks-Specific requirements, Part 11: Wireless LAN Medium Access Control (MAC) and Physical Layer (PHY) Specifications, IEEE Std 802.11-2012, Section 13.10, pages 1382-1413), which combines proactive topology tree building with on-demand route discovery. We share the idea of deploying pre-computed trees. In S. Avallone and G. D. Stasi, "A new MPLS-based forwarding paradigm for multi-radio wireless mesh networks" IEEE Transactions on Wireless Communications, vol. 12, no. 8, pp. 3968-3979, 2013, a "resilient directed acyclic subgraph" method is combined with a load-balancing scheme that allows splitting traffic even in intermediate forwarding nodes. The scheme assumes a hose traffic model with pre-known maximum traffic intensities in edge nodes. Additionally, the network topology is considered to be relatively fixed and only changes when nodes are added or removed (including temporarily). By contrast, in the techniques provided below, traffic is split according to the actual traffic load and the prevailing network capacity. Furthermore, the techniques address nodes that are not removed but have fluctuating traffic peak rates, e.g., between morning and afternoon, as described below. Towards the direction of splitting traffic according to actual load, G. Capdehourat, F. Larroca, and P. Belzarena, "Optimal multipath forwarding in planned wireless mesh networks," Computer Communications, vol. 38, no. 0, pp. 36-49, 2014, proposes "minimum queue length load-balancing", which relies on initial measurement-based learning of a function that represents the average queue lengths for every network link. We also monitor the queue lengths to estimate congestion. However, in techniques presented herein, overcrossing of queue length thresholds is signaled explicitly in real time to trigger traffic diversion if needed. Also backpressure routing (see J. Núñez, J. Baranda, and J. Mangues, "A self-organized backpressure routing scheme for dynamic small cell deployments," Ad Hoc Networks, vol. 25 Part A, pp. 130-140, February 2015) uses queue backlogs for routing decisions, but without giving performance guarantees.

In Spatial TDMA (STDMA) SWMNs, muting must be considered along with link scheduling, as noted in W. J. Jung, J. Y. Lee, and B. C. Kim, "Joint link scheduling and routing for load balancing in STDMA wireless mesh networks," International Journal of Communication Networks and Information Security (IJCNIS), vol 6, no. 3, 2014, which presents a load-balancing scheme by iterating between route and schedule computations. This approach, which aims at maximizing the minimum remaining link capacity, assumes static link capacities and ignores slot ordering in the link schedule. In certain techniques presented herein, route pre-computation makes minimal assumptions about link capacities. Instead, we try to prepare for capacity degradation through route diversity. Our link scheduling aims at minimizing the maximum end-to-end delays on pre-computed primary paths. Our route pre-computation phase produces "stems" of routing trees, which are somewhat similar to "dominating trees" in I. Amdouni, C. Adjih, and P. Minet, "Joint routing and STDMA-based scheduling to minimize delays in grid wireless sensor networks," CoRR, vol. abs/1402.7017, 2014, but in our case, the integration with link scheduling produces gateway paths that are fast bi-directionally, whereas in a sensor network, the interest is in optimizing only the upstream direction.

The effects of mmW link fragility on service availability in mesh topologies have been considered in the following. A. Jabbar, J. P. Rohrer, V. S. Frost, and J. P. Sterbenz, "Survivable millimeter-wave mesh networks," Computer Communications, vol. 34, no. 16, pp. 1942-1955, 2011; and N. Javed, E. Lyons, M. Zink, and T. Wolf, "Adaptive wireless mesh networks: Surviving weather without sensing it," Computer Communications, vol. 54, no. 0, pp. 120-130, 2014. To overcome the link instability, proactive and predictive routing protocols have been proposed, which among other things add bit error rate (BER) to the link metrics. Similarly, we assume the availability of link status information, but along with disseminating this information in the whole network, this information is used instantly at the point of disruption, e.g., to bypass a failing link via a protection path. Here, colored trees (see failures," IEEE/ACM Trans. Netw., vol. 17, no. 1, pp. 346-359, February 2009) could be employed to provide maximally disjoint paths but then many other desirable path properties would be sacrificed.

A motivation for the presented techniques herein to the link scheduling problem of a SWMN can be found from in the following: Tassiulas, L., Ephremides, A., Jointly Optimal Routing and Scheduling in Packet Radio Networks, IEEE Transactions on Information Theory, Vol. 38, No. 1, January 1992. This IEEE paper does not use cyclic schedules but it defines a Minimum Evacuation Time—metric. Research papers that deal with joint optimization of routing and scheduling typically try to prove that they achieve the best schedule in their context. In certain examples herein, any schedule that satisfies the prior End-to-End (E2E) delay criteria for a given collection of paths is allowed and, if there are enough computation resources, a feasible schedule may almost always be achieved. These types of problems have earlier been formulated as cases where the task is to provide some predefined transport capacity (e.g., according to traffic estimates) between node pairs. Some well-known optimization algorithms are used to allocate the link schedules, e.g., link coloring to find a realizable schedule and linear programming (LP) to tune the duration of the color slots, and to compute the routes (e.g., integer LP (ILP)). The process can be iterative, e.g., first allocate link schedules, then do the routing and if the solution is not acceptable, reallocate link schedules using the information about routing bottlenecks, reroute and so on. The disadvantages with this type of link scheduling and routing methods are that they are computationally expensive, and including more optimization requirements make them more complex. Furthermore, the resulting capacity sharing is quite rigid and incapable of reacting to changes in traffic demands. The fault tolerance, moreover, requires special care, e.g., preconfigured protection paths with resource reservations.

Overall, the existing routing and scheduling techniques seem to provide partial answers to the problem of how to give delay guarantees and make the most efficient use of network resources, while taking into account the highly fluctuating traffic load, various flow priorities, and volatile link capacities. An example of an instant approach is an attempt toward a more comprehensive practical mmW WMN solution that could be applied in small cell backhauling. An implementation of the example routing and link scheduling can be quite lightweight as all the resource consuming computation (spanning trees, routing tables and link schedules) can be performed in advance. Furthermore, such computations can be performed outside of the network in dedicated and centralized computing resources. All that is left for the network nodes to do in real time is making the forwarding decisions and monitoring reachability and congestion information. This should allow for low-cost and power-efficient implementations even for high-speed links.

Furthermore, the fastest restoration and reaction times for network anomalies (such as connection breaks and congestions situations) supported by the technologies currently used in transport networks are typically on the level of milliseconds or seconds, originating from the 50 ms restoration time requirements in traditional SDH networks and even longer in case of typical IP protocols.

Section 3. Examples of Embodiments

With an aim toward improving reaction times (for instance), a conceptual framework of self-organizing small cell wireless mesh backhaul (WMN) solution is disclosed here, e.g., with a set of special built-in traffic engineering features that can combine proactive route pre-computation with rapidly reactive self-healing and self-optimization mechanisms. Self-healing may include extremely fast and flexible network level autonomous failure management. The self-optimization may include autonomous backhaul node deployment and configuration with authentication, dynamic and scalable network topology optimization, flexible Quality of Service (QoS), congestion management, and traffic load balancing. These mechanisms allow highly flexible control and steering of the traffic flows inside the mesh network, this enabling automated QoS aware optimization of the traffic at any given time so that the entire transport capacity of the mesh network can be optimally utilized.

WMN based on pencil-beam mmW links and rapid beam steering is assumed in examples. The mmW antenna implementation can be omni-coverage or sector-based. Electrical beam steering enables many links to be supported with the same equipment for added cost-reduction, reliability and simple scaling of the network.

The backhaul network is divided to independent sub-networks called domains, comprising, for instance, a maximum of 200 nodes. In a real life example, one domain could cover a certain part of an urban area deployed with small cells (e.g., micro or pico base stations). Each domain has one or multiple special elements called gateways (GWs) providing the access to the other transport network. Several domains can be combined together to form a large area.

To be more specific, it is possible in an example to create a hierarchical definition of a mesh network as follows:
 Area is a group of domains controlled by a central controller,
 A domain is a group of nodes that have a common link schedule and spanning tree overlay for creating routing paths. A domain must contain at least one gateway, which may be the only node in the domain.
 Physical topology is topology formed of discovered physical links (e.g., reported to and known by the centralized controller but not necessarily scheduled).
 Active topology includes scheduled links in the physical topology.

For fast errorless protection switching and dynamic load balancing, one example of an innovation is to use a pre-calculated set of alternative routing paths from any source to any destination within one domain, i.e., a limited sub-network of backhaul nodes forming a partial mesh topology. These routes are calculated beforehand for a certain topology and are distributed to all the nodes within the domain for local forwarding and load balancing decisions based on the dynamic and local traffic situation. In the instant description, the background pre-calculation is performed in a central entity, but the techniques herein are not limited to a centralized approach.

In certain embodiments, a routing method is proposed that can produce a primary path and a set of backup paths for each source-destination pair. Furthermore, a hierarchical fault recovery system is described that includes various protection and restoration methods that may act in different time scales to ensure fast immediate reaction to failures and then optimal adaptation to the changed situation. One principle behind the routing method is based on multiple spanning trees that are constructed so that the trees offer close to maximal number of node disjoint routes, which provides resiliency and enables load balancing.

An example of a method may include one or more of the following components. There are 13 components that are discussed below, and each is indicated by a number.

1) For this component, a network is divided to smaller limited-size sub-networks (called domains) where independent routing and scheduling is performed. Fast response to link/node failures is guaranteed by selecting a best available routing path from the pre-computed list of alternatives and local status information.

One proposed but non-limiting maximum size is 200 nodes. By limiting the solution space to this number of nodes, we are able to construct methods which are fast to compute (e.g., providing real-time response), will converge quickly, and provide the needed performance for microsecond level fast switching and reduced latency (e.g., milliseconds roundtrip delay between source and destination over multiple radio hops).

Figure 3:
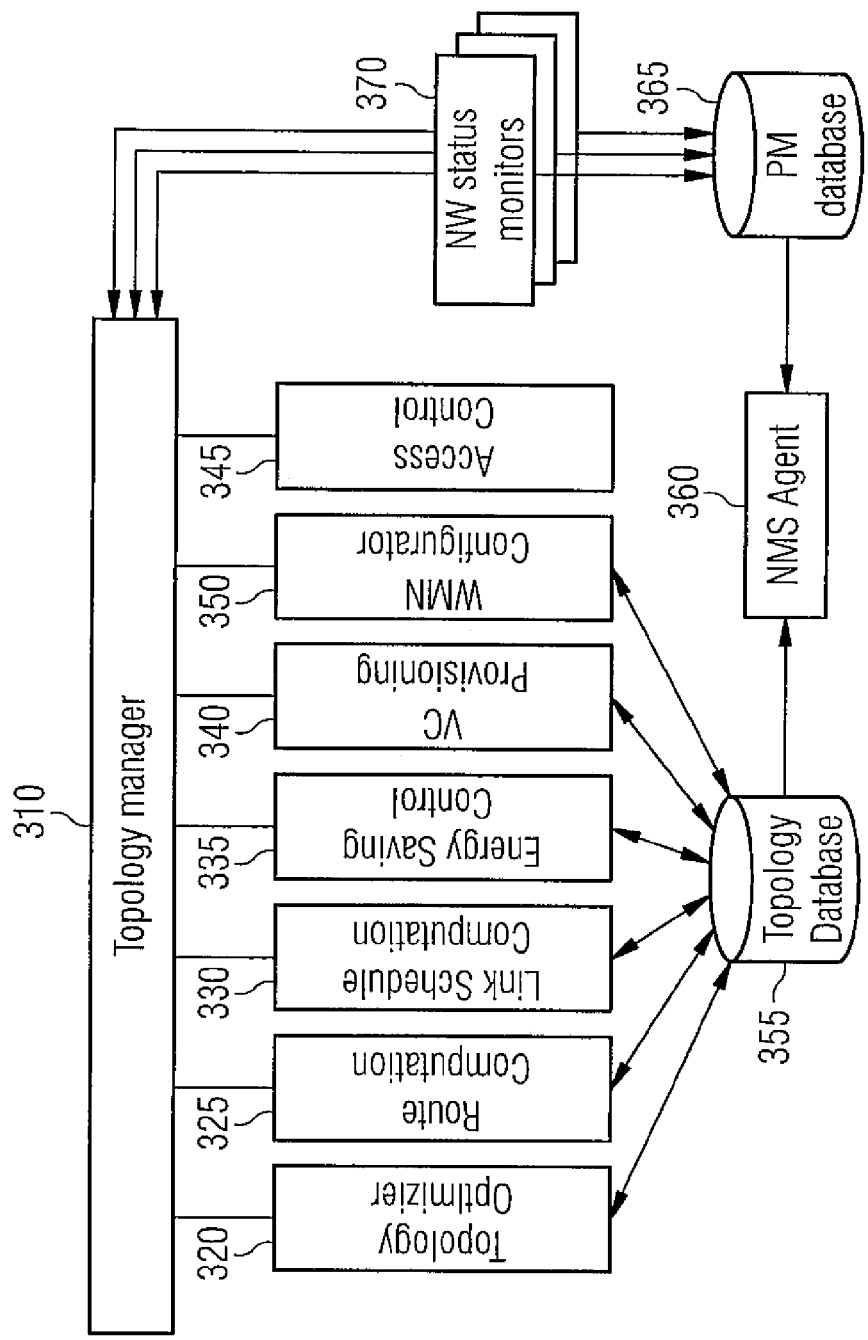
FIG. 3 is an example of topology management functional architecture in certain embodiments.

2) For this component, a topology management system/module is disclosed, e.g., in FIG. 3, that enables the optimal use and sharing of available transport resources. FIG. 3 is an example of topology management functional architecture in certain embodiments.

A topology management function 310 may optimize the division of nodes to domains, e.g., based on their interaction and traffic in-between the nodes. Multiple domains can be combined into an area with a common topology management.

Topology management in the topology manager 310 includes functions that are required for supporting autonomous incremental deployment of a WMN and the WMN's self-organization and self-optimization, and other functions needed for network management. The main functions include access control, topology optimization, route and link schedule computation, provisioning of virtual connections, energy-saving control, and configuration management.

The topology optimizer 320 may perform the following:
 Decide active topology: which links are included in the active network and which are not;
 Optimize the network topology by splitting and merging WMN domains when necessary;
 Allocate node identifiers for new nodes; and
 Indicate if and where new GWs could be needed.

The route computation 325 (see also the discussion of component (4) below) may perform the following:
 Compute new spanning trees (STs) when the physical WMN topology changes;
 Use link schedules and ST structure to assign ST preferences for each source-destination pair in the network;

The link schedule computation 330 computes new link schedules when the WMN topology and/or STs change (see also 5 below).

The energy saving control 335 manages energy-saving functions (see also the discussion of component (12) below).

The VC provisioning 340 manages virtual connection overlays in the WMN.

The WMN configurator 350 composes WMN configurations from new WMN link topology, muting, and link schedule information The network status monitor(s) 370 may perform the following:
 Compose an up-to-date status view based on received messages from WMN;
 Determine which status information to forward to other modules and when (e.g., part of the network status monitoring functionality may reside in the GWs, which aggregate the status information for further centralized processing);
 Report performance monitoring information to an external network management system via a performance monitoring (PM) database 365.

Access control 345 comprises AAA (Authentication, Authorization and Accounting) infrastructure for authenticating new WMN nodes. The term access control refers to connections to external AAA and other similar network management functions.

The topology database 355 includes the presentation of the network topology the nodes, their location (physical or relative), and how they are connected together, i.e., via which links.

The topology management system/module, and especially VC provisioning, may be controlled by an external Network Management system (NMS) via NMS Agent 360.

For an implementation, a centralized entity (here called WCC, WMN Centralized Controller) is assumed (e.g., as SON module 230-2 in SON node 210). By having a centralized control entity that takes care of all background computation and controlling tasks, the requirements for WMN node hardware can be relaxed as all CPU (Central Processing Unit) and memory intensive computations are performed in specialized servers. Furthermore, since WCC can be shared with multiple WMN domains, the CPU resources can be utilized more efficiently. A centralized controller can also better control inter-WMN domain optimizations as all the needed information is in one place.

Distributed implementation (e.g., using SoN module 230-1 in eNBs 220) is also possible, but requires the collection of required information to all nodes in a consistent manner. All nodes must have the same information; otherwise the system may not be able to converge to a stable state.

Figure 4:
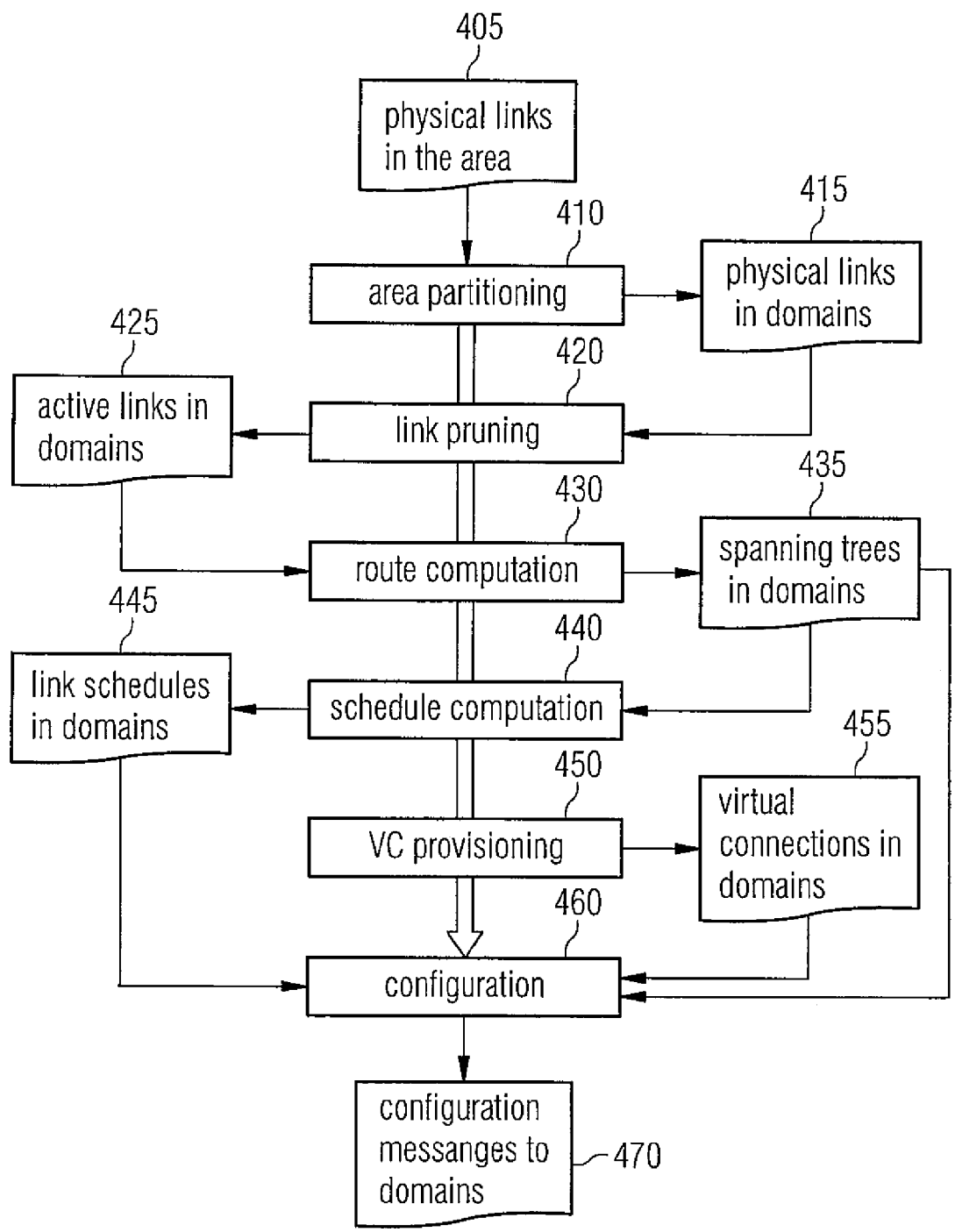
FIG. 4 is an example of topology management process flow, and illustrates the operation of an example of a method, a result of execution of computer program instructions embodied on a computer readable memory, functions performed by logic implemented in hardware, and/or interconnected means for performing functions in accordance with certain examples of embodiments.

Turning to FIG. 4, an example of topology management process flow is shown. This figure illustrates the operation of an example of a method, a result of execution of computer program instructions embodied on a computer readable memory, functions performed by logic implemented in hardware, and/or interconnected means for performing functions in accordance with certain examples of embodiments. The blocks in FIG. 4 may be performed, e.g., by the SON module 230-2 of the SON node 210, which causes the SON node 210 to perform the blocks. The SON module 230-2 and SON node 210 may therefore act as a WCC in an example, and this assumption is used below.

In FIG. 4, the blocks 405, 415, 425, 435, 445, 455, and 470 illustrate data, and the other blocks are functional. In block 410, the WCC (using the physical links in the area data 405) performs area partitioning and creates physical links in domains data 415. In block 420, the WCC performs link pruning 420 (using the data 415) to create the active links in domains data 425. The WCC in block 430 performs route computation (using the data 425) to create the spanning trees in domains data 435. The WCC schedules (using data 435) computation in block 440, which creates the link schedules in domains data 445. In block 450, the WCC performs VC provisioning 450, that is how client traffic is transported over the WMN domain using different STs, to create the virtual connections in domains data 455. The WCC performs configuration in block 460, using data 435, 445, and 455, to create configuration messages to the domains data 470. These configuration messages are sent to the domains to cause the domains to reconfigure.

3) An example is disclosed for this component of an approach where the routing and scheduling problem (within the domain) is divided into two parts—finding first a suitable set of so called primary routing paths in the domain and then optimizing the link schedules for those paths.

4) This component involves a routing scheme that identifies multiple routing paths for each 5G small cell node. This routing scheme may be implemented as follows.

The routing scheme produces primary and backup routing paths for all source-destination pairs for fast failure recovery and load balancing. Multiple spanning trees are constructed so that the trees provide close to a maximal number of node disjoint routes, which provides resiliency and enables load balancing.

The links immediately adjacent to the gateway (GW) are the most important ones and each of these links is called a "stem" connected to the root, which is the GW. Each stem is simultaneously grown into branches until the all nodes in the network are covered. The union of all branches includes all the nodes in the topology.

Each branch is grown into a full spanning tree that covers the whole topology and optimizes leaf nodes. As an example, if moving a leaf node to another parent node (there should be a direct hop link to the parent available) can result in a smaller hop count to the GW, the leaf node is moved. The number of spanning trees is equal to the number of stems, which is equal to the number of routes per node to the GW.

For each node, identify the priority of multiple routes or paths to the GW by performing the following:
  First by hop counts to the GW (e.g., highest priority is fewest hop counts);
  Break tie in an equal hop count situation by using the node weight; and
  The path with the highest priority is called the primary path.

Figure 5A:
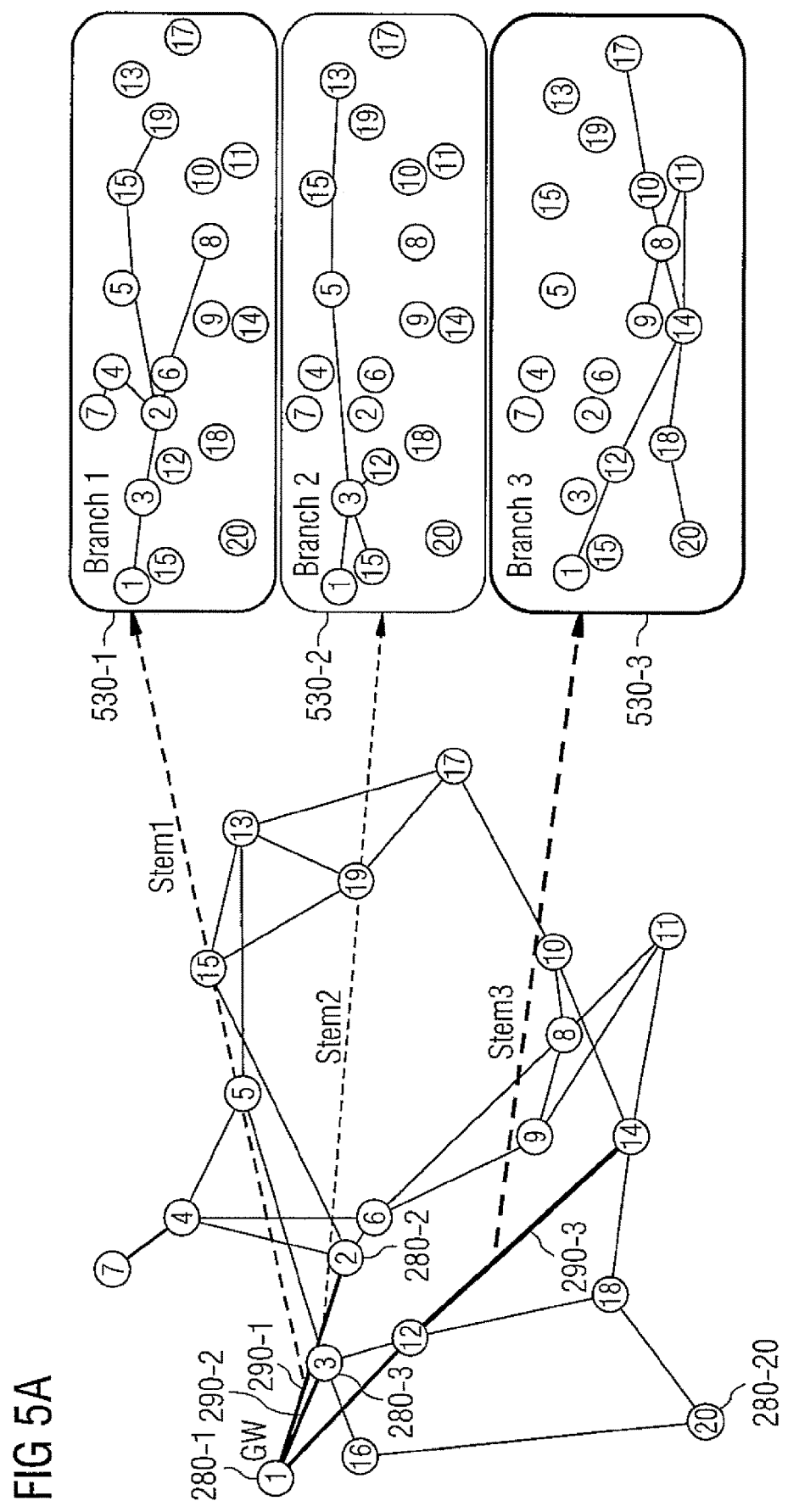
FIG. 5A is an illustration of a stem, a branch, and a spanning tree for an example of a routing scheme for a 5G small cell network 20-node topology.

FIG. 5A illustrates a stem, branch, and tree concept in one example of a proposed routing scheme for a 5G small cell network 20-node topology. That is, there are 20 nodes 280, of which the gateway node is 280-1. There are three gateway (GW) links 1, 2, and 3, and therefore three stems 230-1 (Stem 1), 230-2 (Stem 2) and 230-3 (Stem 3). The total number of links 290 is 32. The three branches 530-1, 530-2, and 530-3, which correspond to stems 290-1, 290-2, and 290-3, respectively, are shown.

Figures 5B, 5C:
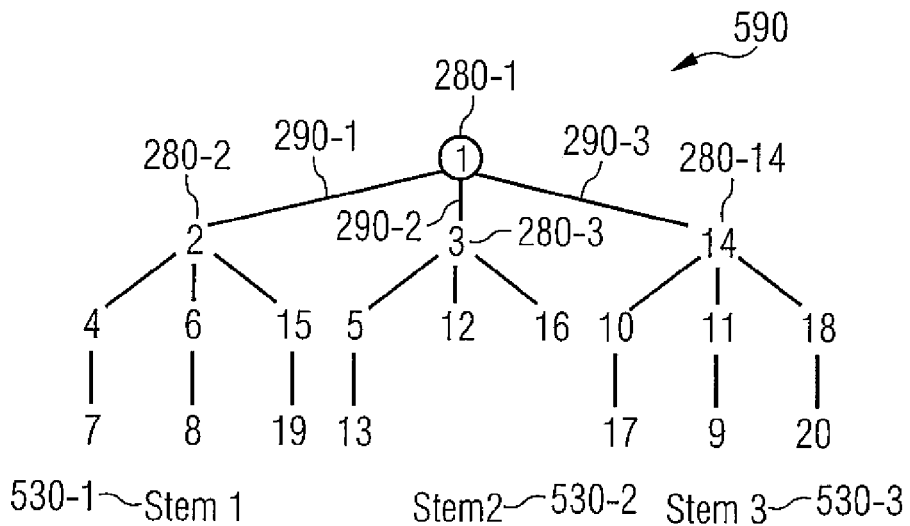
FIG. 5B represents a tree structure view of the stem, branch, and spanning tree in FIG. 5A.
FIG. 5C is a tabular representation of the stem, branch, and spanning tree in FIG. 5A.

FIG. 5B represents a tree structure view of the stem, branch, and spanning tree in FIG. 5A. The three stems 530-1, 530-2 and 530-3 are seen as branches in the tree 590. FIG. 5C is a tabular representation of the stem, branch, and spanning tree in FIG. 5A. FIG. 5C shows the 19 links on the primary path. The idea of the primary path is for delay sensitive traffic. The target was that for the delay (or delay variation) sensitive traffic, an embodiment herein could offer predictable QoS (almost guaranteed by the link scheduling, primary paths and the priority queues).

Weights can be used both on links 590 and nodes 580 to further optimize and tailor the route computation to the use case and real life deployment. By default, all links are equal and all nodes are equal Link weights can for example be used to differentiate low and high (e.g., max) capacity links (e.g., 10-100 Mbit/s versus 1-10 Gbit/s). Node weights can be used to separate different sizes/capacities of cells, e.g., based on their assumed combined traffic throughput.

In a domain having multiple GWs, the above-mentioned procedure is applied for each GW. This leads effectively to a situation where there are multiple path alternatives from each node to all of the gateways, thus providing a protection scheme for GW failures.

5) For this component, a SWMN scheduler is disclosed that first constructs transmission sets and then orders them into a cyclic schedule to ensure optimized E2E delay.

In each schedule cycle, each link should be given at least one chance for transmission by the SWMN scheduler.

Some links are more important than other links and should be given more chances in each schedule cycle, e.g., the GW links and those links that are on the primary path(s), as described below:
  Links which carry at least one primary path are more important than those which do not carry any primary path;
  The links are given a weight according to the a number of primary paths that they carry and the links with higher weight are more important; and
  Important links are scheduled at least twice per schedule cycle.

The SWMN scheduler identifies and constructs a transmission set in each slot with the highest number of disjoint links (where disjoint links can be active at the same time moment). As an example, we propose Greedy[argument]

and GreedyTwice[argument] methods to tailor make a transmission set (other similar methods can be applied as well), as described below.

A Greedy[ ] method which always produces a transmission set is given below.

Go through all links in a descending order from highest weight link first.

For each link, decide if the link can be taken:

Is the link disjoint from those included so far?

Will adding this link interfere with previously chosen links, assisted by an interference matrix $[I_{i,j}]$? For example, $I_{i,j}$ is a binary number indicating whether the transmission of Link i ($L_i$) will be interfering with Link j ($L_j$) or not: $I_{i,j}=1$, if Yes and $I_{i,j}=0$, if No.

A GreedyTwice[ ] method with the Greedy[ ] method is performed twice (in two phases), as described below.

In the first phase, do not select links that have been specified in the argument of the Greedy[argument] function call.

Since nothing guarantees that the result of the first phase is maximal, the Greedy[ ] method is repeated, now including all links.

$T_1$=GreedyTwice[Ø], the first transmission set is identified.

$T_2$=GreedyTwice[$T_1$], try to avoid links in $T_1$, the second transmission set is identified.

$T_3$=GreedyTwice[$T_1 \cup T_2$], the third transmission set is identified.

And this process is continued through additional transmission sets.

The SWMN scheduler identifies the minimal number of slots per cycle that can cover all links in the WMN.

The SWMN scheduler assigns a transmission set to each slot of the scheduling cycle by identifying the order of the transmission sets in the schedule cycle to ensure optimized E2E delay. The optimization target may be to minimize the maximum E2E delay or to minimize the average E2E delay, for example.

6) Another possible component of the overall method is a method to distribute topology configuration information to the nodes in one domain and synchronize the transfer from one topology configuration to another. This transition does not impact the data plane operation (e.g., packet drops are not caused). The topology configuration information contains the following:

a) The pre-computed route alternatives in a form of spanning trees, i.e., a specification of ST structures and WMN node (WN) specific ST preferences. Each ST has its own identifier (STID). Each WMN node has a unique WMN Node address (WNID).

b) The schedule information.

c) General configuration and authentication information.

7) Another possible component concerns use of Virtual Connections (VCs) and traffic flows to transfer the client data over the WMN.

For instance, an ingress node maps incoming traffic into VCs that are identified by VC Identifiers (VCIDs). The mapping is performed based on the traffic ingress port and L2 and/or L3 headers, e.g., Ethernet MAC addresses together with VLAN ID and PCP (Priority Code Point), or IP addresses and DSCP (Differentiated Services Code Point) field.

User data is encapsulated into WMN frames (internal to the concept) that contain the required forwarding information. The egress node removes the WMN header from the frame and forwards the user datagram to a client port. FIG. 6 is a table of WMN frame header fields.

For in-order delivery of the user datagrams, egress nodes take care of re-sequencing the frames.

8) Another example of a component of an overall method is traffic handling. Traffic is handled as flows. Flows are separated by the QoS priority (PRIO) and Virtual Connections IDs. Local forwarding of traffic using pre-calculated route alternatives and based on local load and congestion status information.

At a coarse level, the ingress WN selects a path by using pre-computed path preferences and status of the bottleneck link in each path. Forwarding is QoS aware, i.e., different forwarding decision is made for each priority class.

Forwarding decisions in a WN are made using local forwarding tables. The best available path is based on the preferences set by the route computation. If the first preference route is not available or is too congested or has not enough free capacity to the forward traffic, the secondary path is selected, and the like.

Each WMN node forms and maintains a local forwarding table based on topology configuration information and network status information. The table is updated every time a new topology configuration is received and every time new status information is received from the network indicating e.g. link failures, link congestion or other anomalies.

The ingress WN estimates the applicability of alternative routing paths for each of its traffic flows. The estimation is based on information about the operational and congestion status of the links and on the available link/path capacities, nominal path delays, and on the capacity requirements of the flows. The link status information is distributed in the whole WMN. The operational status of a link is based on status indications received from the wireless physical layer and WMN internal control messaging. Congestion is primarily estimated by the output queue lengths.

Allocation/retention precedence is assigned to the flows in order to select a path for a new flow of a certain priority, and to decide whether an existing flow should be moved to another path. Secondary criteria for path selection include previous flow selection history and overall load balance in the network.

Highest priority traffic will always get the best possible path. The intermediate nodes inspect only STID and WNID when making forwarding decisions. That is, the original selected route at ingress is not changed in intermediate nodes unless there is a failure in the path (see the discussion of component (10) below).

Priority information (PRIO) is used to assign the frames into correct queues at the output port. Strict priority queuing is used as the target to force lower priority traffic to alternate paths instead of sharing the capacity in the bottleneck link in a fair manner. Still, among lower priority flows, traffic is scheduled according to Weighted Fair Queuing (WFQ).

9) This component concerns on-demand dynamic load balancing methods. These methods include one or more of the following.

Path re-selection load balancing is applied only at ingress nodes. Intermediate nodes do not change the originally selected path (except in failure cases, see the description of component (10) below). The same approach as for the initial path selection is used: based on path status information, an alternative pro-computed path is selected from the priority list.

Path re-selection load balancing is flow based. The complete flow is redirected to an alternative path. Path re-selection load balancing is also priority based. The highest priority flow gets first the most optimum routing path, the second highest priority the next best available route, and the like. In path re-selection load balancing, high(er) priority traffic can override and pre-empt low(er) priority traffic flow (or just override low(er) priority traffic flow). Pre-empts means that high(er) priority traffic flow basically replaces the low(er) priority traffic flow. This of course may happen when there is too much congestion in the route. Otherwise (for overriding), lower priority traffic is just redirected to less optimum path (which may face more delay) when the highest priority traffic has used the most optimum, fastest route.

Inverse multiplexing based load balancing (IMLB) is applied to balance low priority bulk or best effort traffic on a packet based fashion. IMLB is applied only for lower priority traffic (since a complete low priority (best effort) flow might be too big for load balancing thus blocking higher priority traffic unnecessarily).

In IMLB, all available paths are used. IMLB is packet based (not flow): each incoming packet is directed to the least congested path. Packets are sequence numbered. Re-ordering is performed at domain egress nodes.

10) This component includes a hierarchical fault recovery system that includes various protection and restoration methods that are acting in different time scales to ensure fast immediate reaction to failures and then optimal adaptation to the changed situation. Fast failure detection and per-packet link quality monitoring combined with pre-computed protection paths result in a near-hitless protection and recovery scheme. The primary action is to re-route the traffic to an alternate pre-computed routing path, and the secondary to restore the broken STs.

Fault detection is event-based. A fault, e.g., a weak received signal on a mmW radio link, should trigger a link state update message that is broadcast from the point of failure to all nodes in the network. This way the nodes will know which of the routing paths are affected by a failure and should not be used in subsequent packet forwarding.

Figure 7:
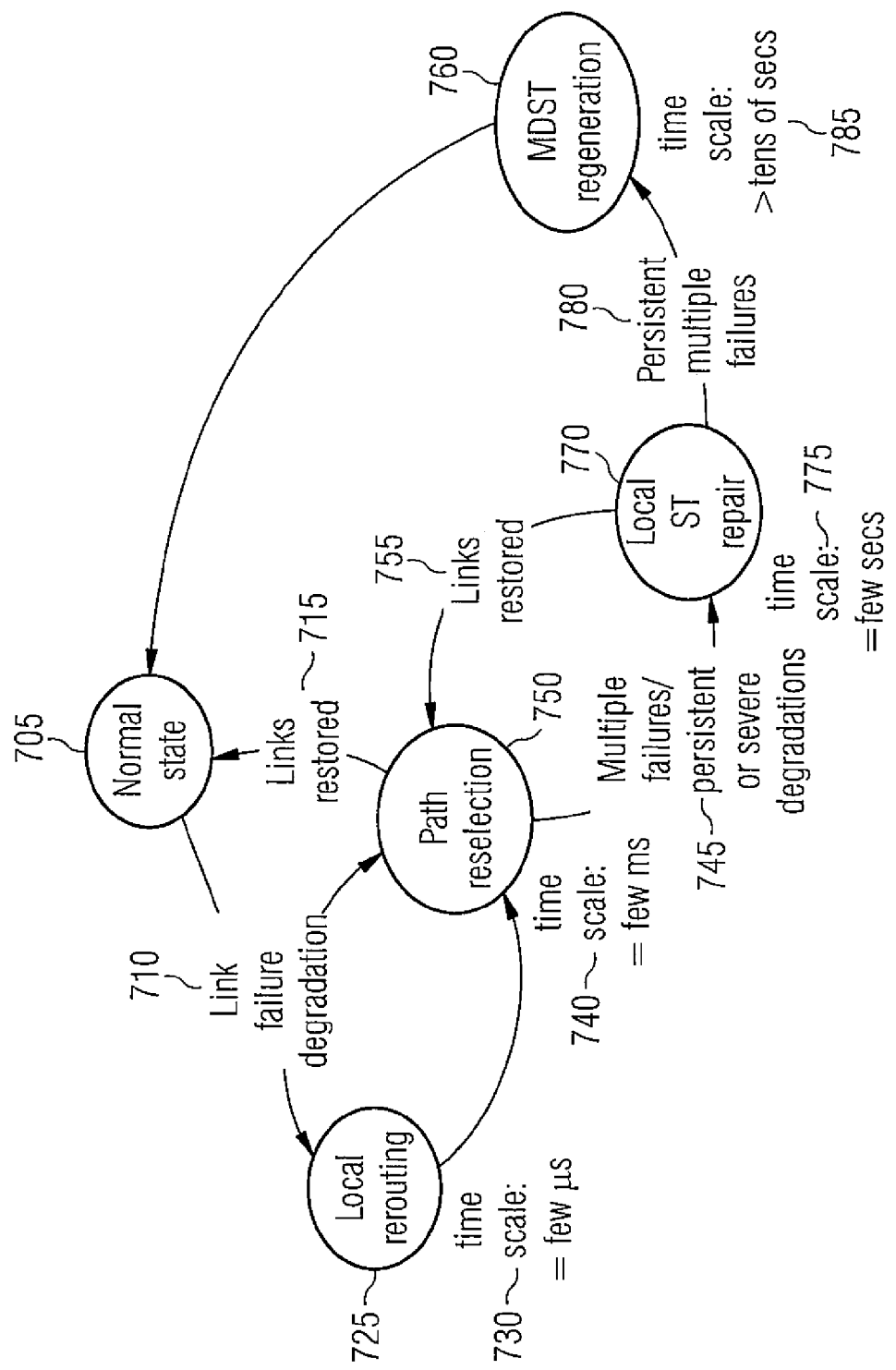
FIG. 7 is an illustration of a multi-stage fault management scheme.

Upon detection of a fault, the hierarchical fault recovery scheme shown in FIG. 7 is applied. Depending on the failure situation, one of the recovery mechanisms is triggered. The time scale taken by various mechanisms varies from few microseconds to tens of seconds.

FIG. 7 shows a normal state 705. If there is a link failure/degradation 710, then local rerouting 725 (in a time scale 730 of about a few microseconds) or path reselection 750 (in a time scale 740 of about a few milliseconds) can be performed. If there are multiple failures/persistent or severe degradations 745, then local ST repair 770 is performed (with a time scale 775 of a few seconds). If the links are restored 755 the flow proceeds to 750. This occurs on a time scale 775 of about a few seconds. If there are persistent multiple failures 780, then MDST regeneration 760 is performed, which occurs on a time scale 785 of greater than tens of seconds.

Fast Local Rerouting (FLRR) (e.g., reference 725) involves re-direction of the traffic that is to be transmitted on the broken link along an alternate pro-computed routing path: the nodes at the point of failure start to reroute packets along ad hoc, bypass path segments towards the desired destinations. There is no need for explicitly configured bypass protection, as route computation provides all the required topology information. The local reroute aims at preventing loss of any remaining in-transit packets on the failed paths, before the path reselection at the flow ingress nodes. FLRR may comprise two alternative methods: Reselect ST and Toss to Neighbor.

Concerning reselect ST (RST), each node maintains path preferences to each destination node in the WMN routing domain. The preferences of the primary paths between GWs and WNs are assigned and configured by a centralized controller (such as an SON module 230). The path preferences between WNs are calculated by the nodes themselves according to hop counts via STs. These preferences are updated every time a node receives a new routing configuration or a link quality change report. If the current path of a packet is blocked by a broken link, the path preferences are checked for an alternative ST to the packet destination via an operational link on the node. If one is found, the packet is rerouted via that ST.

For Toss to Neighbor (T2N), if there are no alternative STs to the packet destination or if the alternative STs would lead to paths with very suboptimal delay, hop count or capacity, a toss to neighbor procedure can be used. Then the packet is sent over an operational link, not necessarily belonging to any of the pre-computed paths, to a neighbor that can route the packet to the destination via the packet's original ST.

The eligible T2N neighbors for each broken link and affected ST-destination node pair are calculated by each node on configuration or link status change. The selection rules are the following in an example:

a) link between T2N node and this node does not belong to the failed ST; and b) path between T2N node and destination node does not contain this node.

To prevent routing loops, a packet priority dependent rerouting counter value is set at the frame creation. On each rerouting, this value is decremented. If this value becomes zero, the packet is dropped.

In the path reselection 750, a corrective route is selected based on the local forwarding table by the next available path from the priority list.

For Local ST repair (LSTR) 770, if the path failure is persistent or there are multiple concurrent faults in the network (e.g., reference 745), local correction to the routing paths will be made. A broken link in an ST is replaced with an operational link not originally belonging to the ST. Signaling among the involved nodes results in local re-arrangement of the routing structure. Each WN maintains information about potential replacement links in case one of its upstream links on a path to a GW would break. As in path selection and T2N neighbor's precalculations, WNs update this information on routing topology changes. For each broken ST, the suitable replacement candidates are the links directly connecting a WN to upstream and another WN to downstream along the ST from the breaking point. The LSTR procedure is initiated by the node with a broken link towards the GW (the initiating node, IN). The IN sends a signal to activate the repairing link to the downstream end-point node of the link (the repairing node, RN). The RN updates its forwarding preferences and routing to use the new link and notifies the other nodes of the repaired ST.

Figures 22, 23:
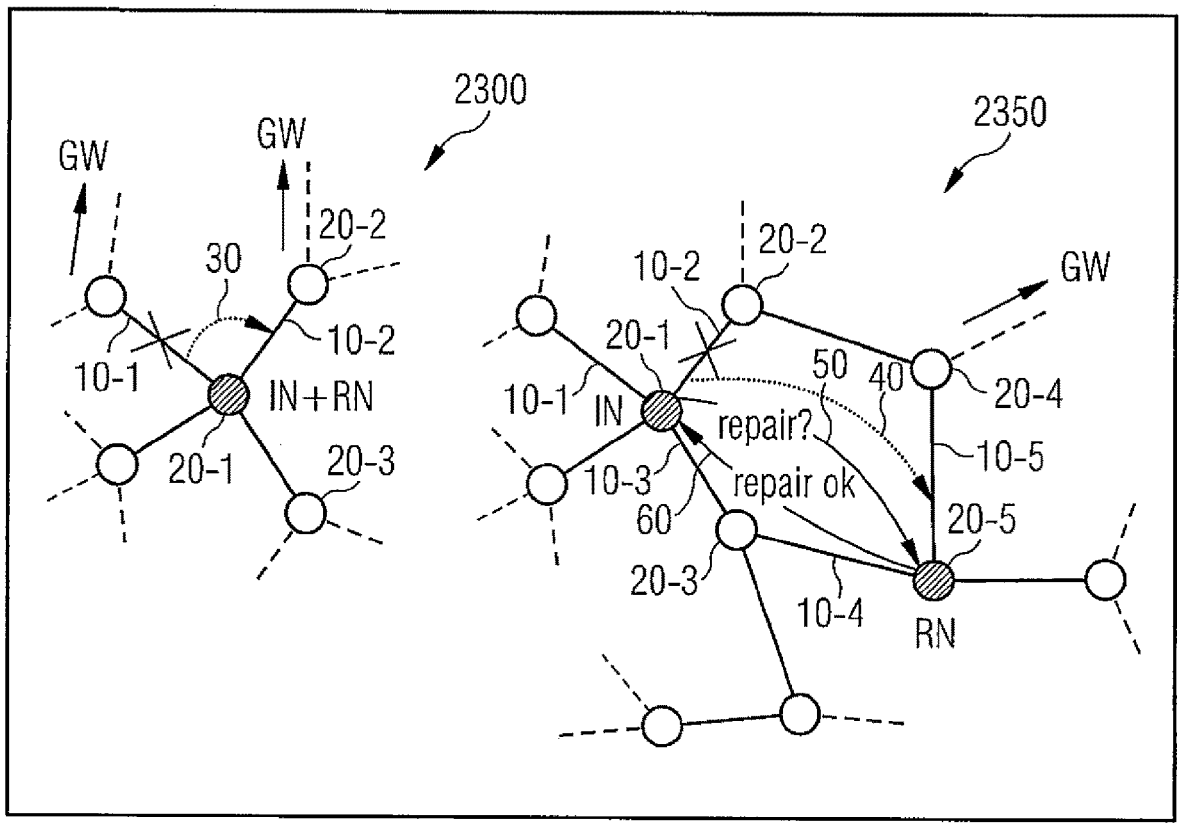
FIG. 22 is a TAILOPT procedure, which moves leaf nodes to better a parent node if such is available.
FIG. 23 illustrates examples of local ST repair in action, where in the left side, IN can be also RN, and in the right side, IN must ask another node to repair the ST.

FIG. 23 illustrates examples of local ST repair in action. In the left side 2300, the node 20-1 illustrates that the IN can be also the RN. On the left side 2300, the link 10-1 is in the current ST but the link 10-2 to the node 20-2 is not. The "X" on link 10-1 indicates that the link 10-1 is broken at some point, and the node 20-1 acts as both IN and RN to switch STs to enable the link 10-2 (as indicated by reference 30). The RN (node 20-1) updates its forwarding preferences and routing to use the new link and notifies the other nodes of the repaired ST.

In the right side, the IN (node 20-1) must ask another node (node 20-5) to repair the ST. The "X" on the link 10-2 indicates that the link 10-2 (part of the current ST) is broken at some point, and the IN (node 20-1) sends a "repair" message 50 to the RN (node 20-5) via links 10-3, 10-4 and node 20-3. The RN returns a "repair OK" message 60 once the link 10-5 becomes part of the current ST. Thus, as indicated by reference 40, the link 10-2 is switched to link 10-5. The RN (node 20-5) updates its forwarding preferences and muting to use the new link and notifies the other nodes of the repaired ST.

Finally, if the failure situation lasts a long time (i.e., is considered to be permanent), all the routing paths are re-computed and the entire network is reconfigured. This occurs in MDST 760. If a link remains broken long enough, the end nodes consider the link as removed and send a topology change report to a centralized controller (such as a SON module 230). After receiving one or more reports, the centralized controller computes the routes using the new topology from which the reported faulty links and nodes are omitted. The updated configuration is sent to the nodes.

Switching to a protective path can also be performed proactively before the fault condition appears using link-quality prediction mechanisms and smart traffic engineering. High(er) priority traffic can pre-empt low(er) priority traffic.

11) This component includes a method of distributing local failure identification and link status information within the network domain.

Both link and path statuses are monitored, and the operational status of a link is based on status indications received from the wireless physical layer. Periodic "Hello" messaging is used to verify the reachability to the neighbor WNs, over all links to all neighbors. Congestion is primarily estimated by the priority-specific output queue lengths.

The link status information is distributed in the whole WMN using Link State Update (LSU) messages. A WN sends an LSU when it detects a significant link status change (i.e., a link fault or degradation that implies a change in the link capacity) or a change in the traffic load on the link. The LSU may be propagated in the control plane along an ST specified in the LSU message. Each WN forwards a received LSU to its own neighbors (i.e., the parent and children in the ST), except for the neighbor from which the LSU was received. The LSU will thus be "tree-casted" to all WNs residing in the ST's sub-trees rooted at (and reachable by) the original sender WN of the LSU.

For each link state event, the WN sends an LSU along all STs that traverse the link in concern. This means that all other WNs will receive the LSU through many STs, which provides robustness against LSU message loss due to load or due to breaks in ST connectivity, due to link failures in the network.

12) This component provides support for both unidirectional and bidirectional client traffic (e.g., traffic fed to the WMN system in any of the nodes or gateways) and routing of upstream and downstream directions of bidirectional traffic either through the same routing path or through different routing paths. The latter option provides better opportunities for load balancing.

13) This component includes an energy optimization module that enables energy-efficient use and optimization of transport resources.

For instance, and Energy-saving Control Module (ECM) takes care of energy-saving at WMN node and link level. Its operation should be coordinated with the client layer, e.g., management layer indicates which client nodes are potential sleepers. Alternatively, the ECM learns this by itself (e.g., the node is idle most of the time) and can also propose potential sleepers to the client layer. The WN node can also request a shutdown based on its internal self-diagnostics.

When potential sleeping nodes are indicated, they will be forced to be leaf nodes at all spanning trees to allow for putting the WMN node to sleep without affecting ongoing traffic. New topology configuration information is distributed and after activation the WMN node is put into sleep.

The ECM includes a wake up procedure. Furthermore, link level energy saving is taking into account in topology optimization. The ECM will guide the optimizer (e.g., topology optimizer 320) based on the information from client layer. The ECM process is also followed for maintenance purposes, providing a graceful shutdown of node without the need to activate protection schemes.

One example of a scheduling scheme is described in more detail in appendix A. Examples of routing and failure recovery schemes are described in more detail in appendix B.

Section 4. Example Possible Implementations and Example Possible Advantages

One possible technique is purely SW based (e.g., using computer program code 153 and/or 197 in FIG. 1) without any specific HW requirements. The SWMN node SW is the same for GW and normal non-GW nodes. It can reside either in base station, in site router or in wireless backhaul radio equipment. The centralized entity, i.e. the WMN centralized controller (WCC) (e.g., implemented as part of the SON module 230), responsible for background route calculation, link scheduling, topology optimization and energy efficiency optimization can reside in the gateway node or anywhere in the network (e.g., cloud implementation).

The implementation of the proposed routing and link scheduling can be quite lightweight, as all the resource consuming computation (spanning trees, routing tables and link schedules) can be performed in advance. Furthermore, such computations can be performed outside of the network, e.g., in dedicated and centralized computing resources. All that is left for the WMN nodes to do in real time is making the forwarding decisions and monitoring reachability and congestion information. This should allow for low-cost and power-efficient implementations even for high link-speeds.

Examples of non-limiting use cases applicable to embodiments herein are described as follows.

Use Case 1. High Availability Backhaul Connections

It is expected that small cells will be deployed in volume and traditional backhaul topology such as tree, daisy-chain, etc. will not be scalable or not provide the level of availability and reliability that operators desire. To allow higher availability and reliability for small cell wireless backhaul, each node should have at least one alternate route to the gateway or aggregation node if possible. In other words, the focus should be on leveraging a (partial) mesh connected network to increase the availability and reliability instead of focusing on link redundancy such as 1+1 or 2+0 hot standby configuration, a relatively costly provisioning. As is known, hot standby is a method of redundancy in which the primary and secondary radio links are in operation simultaneously. Often the radios share the same antenna. The data is duplicated to both links so that both transfer identical information real time. In the 1+1 configuration, one of the links is active, and the other one is in standby mode (typically actively receiving, but transmitter turned down). When the active links fail, the stand-by unit is activated. In the 2+0 configuration, there are two independent primary links from point A to point B without any redundancy.

Reasonable availability and reliability for individual backhaul connections on the level of 99.5-99.99% (percent)

is required, but on the backhaul network level higher level of reliability such as 'five 9s' is often mandatory (including the effect of possible macro overlay). These requirements should include route diversity protection for high priority traffic, protection against environmental conditions (weather), any temporal objects on the radio path, and different levels of equipment failures.

Use Case 2. Low Latency Backhaul

Latency is also a critical parameter for future mobile systems and one of the key challenges for future backhaul networks. Low end-to-end latency is required by many services. The unidirectional total packet transport delay for high priority traffic is expected to be up to 20 ms, including fixed parts of access, aggregation and backbone delays together. The queuing delays are not included in the above figures: low priority traffic may face considerably longer delays. Proposed LTE(-A) target is 1-10 ms. In 5G, the end-to-end latency should be even shorter, in the range of 1 ms. Thus relatively strict requirements for latency in the range of few ms (milliseconds) over the last hop backhaul network connections must be assumed. Individual backhaul link connections should support a few hundred its of max latency.

Use Case 3. Small Cell Deployment

Mobile operators are deploying small cell base stations to expand the capacity of their growing wireless networks. The number of small cells to be deployed in a given geographical area will be significantly higher than the number of macro cells. Traditional macro cell based network planning and topology management will be inadequate to address the needs of operators for a quick and cost-efficient deployment model. For example, if adding a new node, the operator needs to pre-plan all the network connectivity beforehand and engineer traffic to accommodate load fluctuation manually, it will not be effective or efficient enough to deploy small cells in large quantity. Also, in many cases small cells are deployed in places such as lamp posts and utility posts with limited access to wired backhaul transport solutions, wireless backhaul provisioning will the norm (normal). If the deployment requires labor intensive wireless backhaul link alignment and neighbor discovery, it will be very challenging (if not impossible) to have a good business case to deploy a large number of small cells quickly and cost efficiently. HetNet topology, where the small cells number typically a magnitude of order higher than that of the macro cells, is also more complex to manage. It will be difficult for traditional simple hub-and-spoke, tree, or ring topology to meet the need of a resilient backhaul network with high reliability and availability. Operators are requiring a small cell backhaul solution that is easy to deploy and that comes with a self-optimizing topology management capability enabling network resiliency.

An important characteristic of small cell deployment is that due to the larger number of nodes and links, less planning and optimization of backhaul links, including alignment of antennas, is desired as opposed to typical macro cellular deployments. Additionally, optimal placement of nodes from a backhaul perspective is more difficult. In a small cell wireless backhaul network, one of the most desired features is automatic link alignment, enabling autonomous network build up and system start up after the field installation of the backhaul elements to the site. The requirement to pre-plan the exact site location for the nodes, the positioning of the equipment and connections to other nodes can be relaxed to some degree.

A simple and quick "Drop-and-Leave" field installation is required for small cell deployments when the number of installed nodes will increase heavily. A new node needs to be added autonomously without manual link alignment and configuration to the existing network. After powering up, the nodes are expected to autonomously discover and establish connections to the other nodes within the range of their wireless links, authenticate themselves, and form an ad hoc wireless mesh network. Manual configuration should be limited only to node and site identification (e.g., GNSS coordinates, node ID). Nodes will indicate their readiness to the installation person. After the indication, the installer can move to the next site location.

Important automated deployment features for a self-deploying mesh backhaul may include the following:

Automated wireless link alignment (e.g., no manual work);
Autonomous neighbor discovery and connection set up;
Authentication and self-configuration of network parameters;
Node insertion/deletion not impacting live traffic in the backhaul network; and
Managing and optimizing the ad hoc network topology.

The introduction of small cells in any cellular deployment, especially outdoors, brings new challenges associated with the actual deployment effort. Many, but not all of the small cell nodes are expected to be mounted below rooftop, typically on light or utility poles and sides of buildings. Access to these locations often requires temporarily blocking streets and pedestrian walking paths such as sidewalks to facilitate a safe installation and configuration of the new small cell node and its associated backhaul or transport. If the transport uses a wireless technology, the installation time of the small cell node can be increased significantly as one must deploy both the access layer radio as well as the transport radios and align the antennas for both. Aligning the antennas for the transport layer radios can be time consuming, especially if a higher frequencies radio with higher directivity antennas is used, as is often the case for high capacity and low latency connections. The extra time spent aligning the transport radio antennas can often be more significant than that of the access layer radio antennas because their alignment is often critical to get exactly right in order to ensure a high quality transport link. Alignment of the transport radio antennas also often requires two installers, one at each end of the link in order to perform the alignment correctly and as quickly as possible. This extra effort results in higher deployment costs for the operator. These costs will rise as the number of small cell nodes in a network increases.

Use Case 4. Network Changes During Operation

Once an initial deployment is established, changes in the network must also be accounted for. Examples include the addition of new nodes to extend coverage or add capacity, the deletion of a node due to a change in coverage or capacity demand at a given location, or the deletion of a node due to failure, maintenance or energy saving activity. Reconfiguring for these types of changes should largely be automatic. The new node needs to be added autonomously to the existing network without manual configuration. Thus the inclusion of a new node to the existing network should follow the same procedure as when initially deploying the network when it comes to neighbor discovery, authentication, initial alignment, configuration, provisioning and optimization. For a node to be deleted or removed from existing network, deletion or removal can be either a planned event or an unplanned event. A planned event can be when a node is put into sleep mode to conserve energy, or removed from the topology due to a scheduled maintenance event as examples. An unplanned event can be a power outage, link blockage, or node malfunction, etc.

Use Case 5. Backhaul Network Topology Optimization

A small cell with a self-optimizing wireless mesh backhaul module enables operators to easily add new small cells within their HetNet deployments. Each time a new small cell is installed, the optimal backhaul connectivity and network topology will be reconfigured autonomously. A network topology optimization mechanism should be in place to handle various topology related events, such as node insertion or deletion, temporary or permanent link outage, network congestion, node failure or maintenance, domain splitting or merging, energy-saving action like putting certain nodes to sleep, and the like.

When the small cell network has only a few nodes, it is easy to group them into one single domain and configure delay/latency optimized communication paths for each node. As more and more (several tens of) small cells are added to the network, it will be difficult for the network topology with a single domain to attain optimized communication paths. At one point, a domain needs to be split to two to maintain optimal size in each domain. In certain cases when there are multiple domains, each with a relative small number of nodes, merging domains can achieve better efficiency for network topology optimization.

To meet the expectation of operators to deploy small cells quickly and cost-efficiently in a self optimizing way, we will need a wide area topology optimization mechanism that is capable of the following:

Autonomous node insertion and removal with authentication;

Putting together into one domain nodes that are having a lot of traffic in-between them;

Maintain delay/latency optimized communication paths;

Maintain optimal domain size automatically;

Maintain optimal active topology, neighbor reachability maintenance (not every reachable neighbor needs to be connected);

Multiple domains network topology optimization, for example, moving certain nodes from one domain to the other depending on the (changing) traffic needs;

Backhaul network congestion traffic load balancing and rerouting optimization;

Node and link failover traffic rerouting optimization;

Network load adaptation optimizing the backhaul capacity allocation to meet the offered load needs;

Preventive network topology adaptation for planned events (e.g., node maintenance, energy-saving sleep mode, etc.); and/or Network outage recovery due to environmental factors such as power outage, weather etc.

Use Case 6. Traffic Steering and Load Optimization

Figure 8:
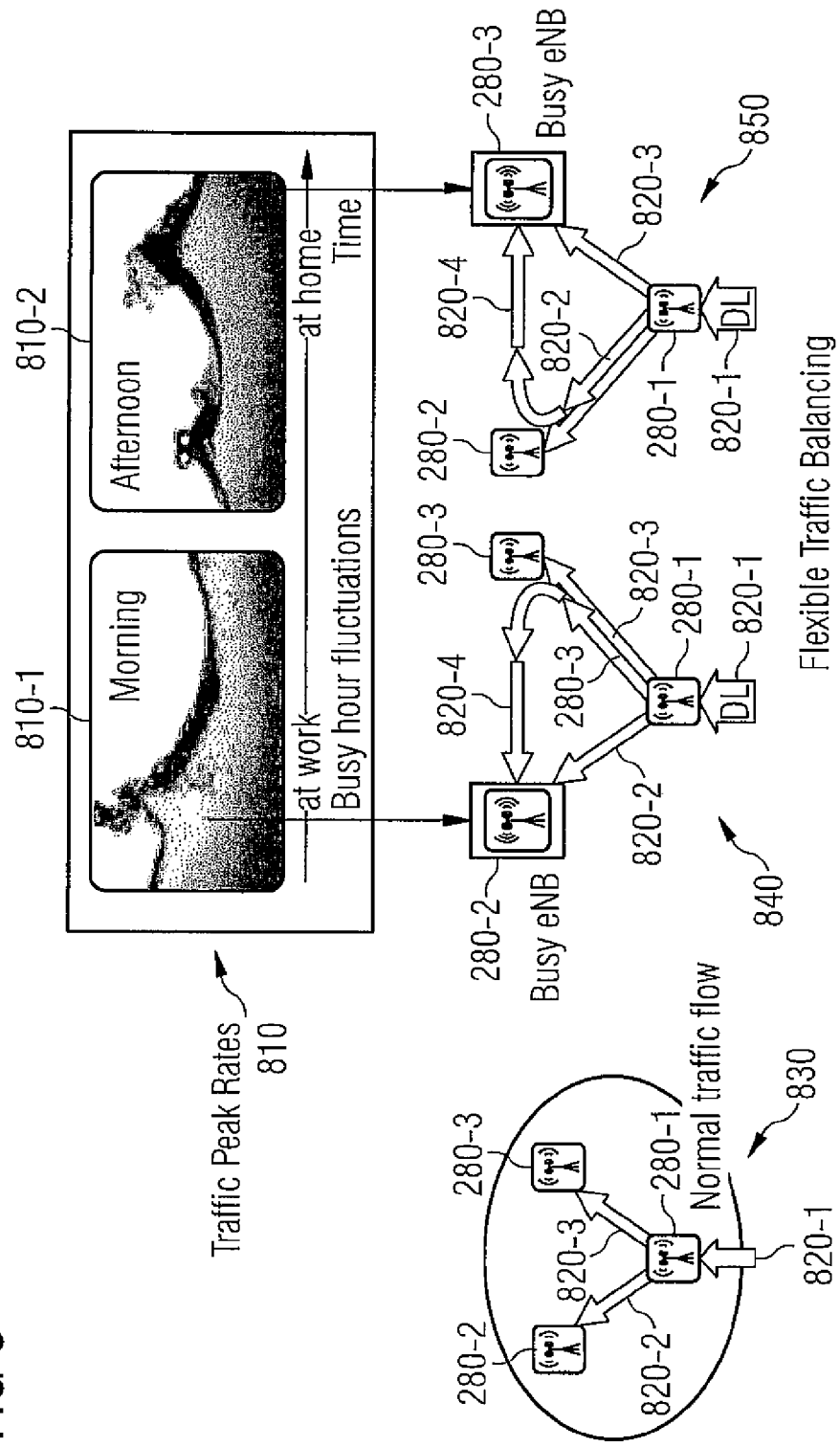
FIG. 8 is an example of a dynamic route optimization use case.

In a small cell network, traffic or offered load can fluctuate in an event-driven way. For example, during rush hours, traffic is moving in and out of office buildings. But, during lunch time, traffic is moving toward the area with many restaurants and shops. FIG. 8 shows an example of the dynamic route optimization capabilities where one small cell node (eNB) experiences higher traffic peak rate in the morning but the other node experiences higher traffic peak rate in the afternoon. The backhaul network should be able to move traffic accordingly to balance the link load properly.

As illustrated in FIG. 8, reference 830 shows a normal traffic flow between the node 280-1 (e.g., a macro eNB) and two nodes 280-2 and 280-3 (each a small cell eNB). Reference 820-1 indicates a link (e.g., a backhaul link) and the size of the arrow indicates the amount of the flow. The normal traffic low 830 is split evenly between link 820-2 (e.g., a backhaul link) to the node 280-2 and link 820-3 (e.g., another backhaul link) to the node 280-3. Traffic peak rates 810 are also shown, which illustrate a morning traffic peak rate 810-1 and an afternoon traffic peak rate 810-2. As can be seen, the busy eNB is the eNB for the node 280-2 for the morning traffic peak rate 810-1 (see reference 840), and more traffic flow is sent via the link 820-2 from the macro node 280-1 to the small cell node 280-2 as compared to the traffic flow that is sent via the link 820-3 from the macro node 280-1 to the small cell node 280-3. Note also that there is another link 820-4 from the small cell node 280-3 (with less peak traffic rate) toward the busy eNB at small cell node 280-2. By contrast, the busy eNB is the eNB for the node 280-3 for the afternoon traffic peak rate 810-2 (see reference 850), and more traffic flow is sent via the link 820-3 from the macro node 280-1 to the small cell node 280-3 as compared to the traffic flow that is sent via the link 820-2 from the macro node 280-1 to the small cell node 280-2. The link 820-4 in this situation is from the small cell node 280-2 (with less peak traffic rate) toward the busy eNB at small cell node 280-3. Note that this example assumes downlink is the primary driver of traffic peak rates, but similar techniques may be applied for uplink too.

Another example of required dynamism involves ad hoc change of traffic. For example, during a sports game, traffic is concentrated within the sports stadium. However, after the game is over, the majority of traffic will be moving to the pubs, parking lots, public transit, etc. The small cell network including backhaul needs to be able to cope with these changes economically.

With the time-of-day and event driven dynamic route optimization examples, we can list some important system level requirements for the small cell backhaul network:

The small cell backhaul network should be designed to cope with traffic fluctuation dynamically with traffic re-routing and load balancing algorithms;

The unused transport capacity in the network is released to use by dynamically sharing the total throughput capacity of the network among the nodes according to their time-varying traffic needs;

The total throughput of a single network domain is optimized based on e.g., the link load conditions and client traffic profiles;

The congested and deteriorated links should be by-passed with one or more alternate paths;

In the ultimate case when all the paths get congested, the network can signal the small cell nodes and the server gateways to temporarily reduce the traffic entering to the backhaul.

Use Case 7. Outage and Degradation Protection

Time when a connection is not available is an outage, and important metrics here are mean time between outages and mean outage duration. Outages may be caused by equipment or power failures, or obstructions on wireless links such as heavy rain, trees or vehicles. Another potential cause of outage relevant to small cell backhaul is 'pole sway' where small movements of the backhaul unit can cause misalignment of high gain antennas of wireless solutions. Resilience is the ability of a connection to recover quickly from outages or avoid them altogether. Techniques include battery backup, equipment redundancy or topologies with multiple routing options. Implementing such techniques does in general increase costs, so a balance must be struck between high availability and low cost. The small cell transport network needs should be robust to failures of various network elements and to degradations in the links between nodes.

Small cells are not designed to be on par with higher cost macrocells with redundancy built in within the node or the link connected to the node. Network topologies with alternate paths will be the way to achieve higher resilience to failure. During the initial deployment for small cells, simple topologies like point-to-multipoint, daisy-chain, or tree and that do not have alternate path(s) to re-route traffic during node or link failure may be fine. After more small cells are deployed and when operators are requiring more protection and resilience to their deployed network, we expect the network topology will evolve to those with alternate paths, such as ring and mesh.

Wireless transport is expected to be used for a small cell transport layer. Higher frequencies radios are most likely to be used due to the higher capacities offered by the availability of more spectrum at higher frequencies. Potential RF link degradations or outages due to environmental factors may be a concern at these frequencies. Examples of these degradations include variable and potentially high attenuation resulting in an outage due to heavy rain or snow, the presence of foliage that may appear as trees grow over time and begin to obstruct a RF link at street (e.g., utility pole) level, and the reflective and absorptive losses of structures if RF links are established that rely on reflections from buildings or other objects. Link degradations may also occur due to RF interference from other wireless links in the area.

It is expected that operators will require re-routing and load balancing be used if the wireless link is degraded but has not yet become a complete outage. For example, the available capacity on the link might become limited due to temporary high rain attenuation. This can cause congestion in the transport layer and possibly increased latency in traffic delivery. In this case, such a condition should be detected and a portion of the traffic can be re-routed while still maintaining some traffic through the degraded link. Decisions about how much traffic to re-route and which traffic to re-route will depend on various traffic priority or QoS classifications. A combination of re-routing and load balancing mechanisms will handle these cases.

Multiple links may be affected by larger scale weather events with small cell deployments where typical cell radii may only be on the order of a few hundred meters or less. The same mechanisms apply as described above for a single link but additional considerations for load balancing may be required so as to not route all traffic for multiple links to the same path which can result in congestion.

One final use case for re-routing or load balancing occurs when enough traffic is passing through a particular node in a complex mesh topology even without environmental factors that can cause degradations in performance. Mesh structures require careful load balancing of the traffic to ensure no single node or branch of the mesh becomes congested.

Use Case 8. Energy Saving Use Cases

A typical critical cost for the operator is energy expenses. It is important to flatten total energy consumption despite traffic growth. Cutting energy expenses is not only about containing operational costs but also a social responsibility.

3GPP TR 36.902 for SON has an Energy Savings (ES) use case:

Cuts on energy expenses could be realized if the capacity offered by the network would match the needed traffic demand at any point of time as close as possible. (3GPP TR 36.902); and Cuts on operational expenses through energy savings (3GPP TR 36.902).

A small cell is a low-power, low-cost radio base station whose primary design objective is to provide additional capacity injection and superior cellular coverage. However, if left unchecked, a large-scale small cell deployment can substantially increase the network energy consumption with significant ecological and economic implications.

Because both small cell and the wireless backhaul consume significant power, we need to have a holistic and innovative view on energy consumption for the whole small cell cluster. The network needs to intelligently decide which node and link to sleep, to wake up, to optimize small cell topology, and to route and schedule traffic accordingly. A node can also be in a low energy consumption mode with lower modulation and code rates supporting lower throughput and that requires lower transmit power and may be reduced baseband processing. In this case, low access traffic is expected and other traffic should be steered away from nodes that operate in low energy consumption mode.

Section 5. Possible Commercial Impacts, Benefits and Technical Effects

The example SWMN embodiments herein can offer a wide array of self-optimization features, flexible QoS (Quality of Service), congestion control and management, extensive load balancing, and traffic management features. These mechanisms allow a highly flexible control and steering of the traffic flows inside the mesh network thus enabling automated QoS aware optimization of the traffic at any given time so that the entire transport capacity of the mesh network can be optimally utilized. Some benefits to the operators and therefore high commercial values for the examples of the implementations described herein include one or more of the following:

1) SWMN can reduce the amount of detail link configuration work normally associated with a wireless transport network.

2) SWMN enables the flexibility to use more mounting locations for each node where fiber access is not available.

3) SWMN reduces the optimization effort by the deployment staff via autonomously deploying the wireless transport layer for 5G small cells and optimizing connections between nodes.

4) Network topology can be changed without impacting existing traffic, e.g., new nodes added, existing nodes removed or put into energy saving state. This is important since small cell networks typically grow organically by starting from hotspots, increasing cell density slowly according to the traffic increase.

5) SWMN enables real-time network optimization wherein congestion and fault situations the traffic flows are rearranged based on QoS, network load and environmental conditions.

APPENDIX A: ONE EXAMPLE OF A SCHEDULING SCHEME

Figure 9:
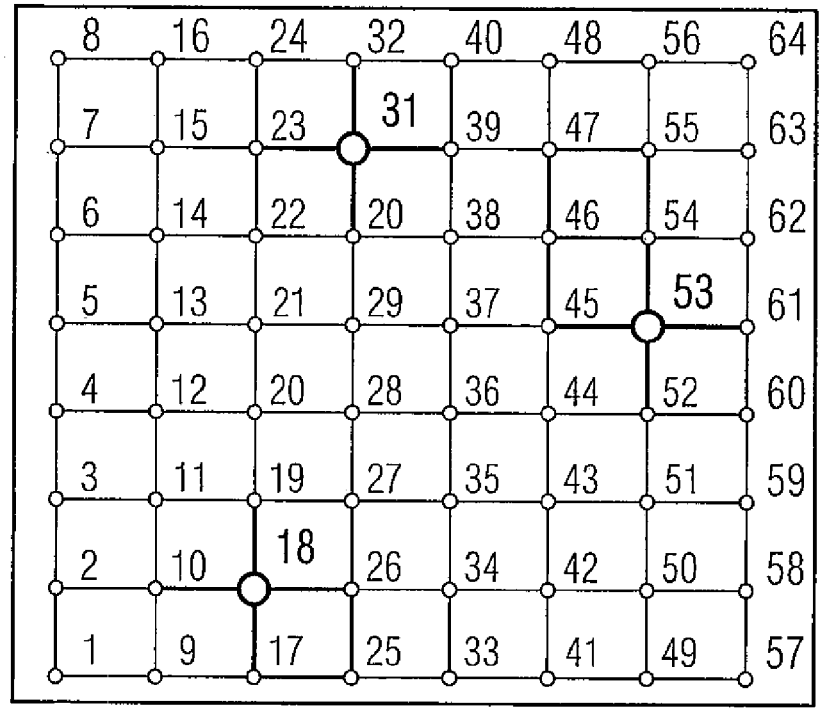
FIG. 9 is an example of an 8×8 grid SWMN.

This section concerns an example of an SWMN scheduler. To illustrate an SWMN scheduler idea, consider the example of an 8×8 SWMN as illustrated in FIG. 9. Let the nodes 18, 31 and 53 serve as gateway (GW) nodes and the GW links (larger lines around the GW nodes, e.g., from 23 to 31, 31 to 39, 31 to 32, and 31 to 30 for GW node 31; 10 to 18, 18 to 26, 18 to 19, and 17 to 18 for GW node 18; and 45 to 53, 53 to 61, 54 to 54, and 52 to 53 for GW node 53) are the most important links for the scheduling.

Figure 10:
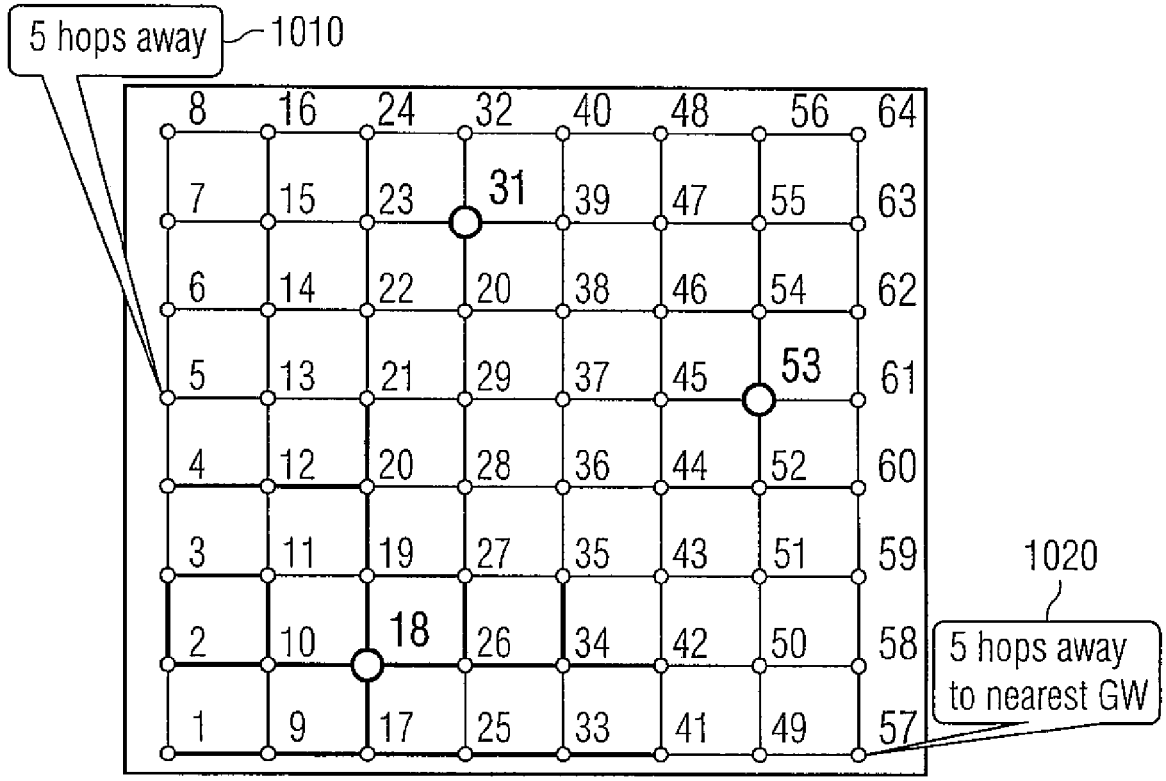
FIG. 10 illustrates the primary paths of GW 18 in the 8×8 grid SWMN from FIG. 9.

Each node will have a unique primary path to the optimal GW. See FIG. 10, which illustrates the primary paths of GW 18 in the 8×8 grid SWMN from FIG. 9. Primary paths which end at GW node 18 are shown in dark lines in FIG. 9 and include the following hops: 1 to 9, 9 to 17, 17 to 18, 17 to 25, 25 to 33, 42 to 34, 34 to 35, 34 to 26, 26 to 27, 26 to 18, 18 to 10, 10 to 11, 10 to 2, 2 to 3, 18 to 19, 19 to 20, 20 to 21, 20 to 12, and 12 to 4. The primary path is determined by the primary spanning trees. The dark-lined structure in FIG. 10 is not a spanning tree; instead, it is formed from pieces of four different spanning trees stemming from GW node 18. Links which carry at least one primary path (darker, thicker lines) are more important than those which do not carry any.

As illustrated by reference 1010, node 5 is five hops away to the nearest GW: hops 5-13, 13-21, 21-20, 20-19, and 19-18 to the GW at node 18; hops 5-6, 6-7, 7-15, 15-23, and 23-31 to the GW at node 31. Note also there are two more paths with 5 hops (using a shortened structure): from node 5, through nodes 13, 21, 29, 30, and to node 31; and from node 5 through nodes 4, 3, 2, 10, and to node 18. As illustrated by reference 1020, node 57 is five hops away to the nearest GW, node 53: from node 57 through nodes 58, 59, 60, 61, and to node 53; and from node 57 through nodes 49, 50, 51, 52, and to node 53.

Figure 11:
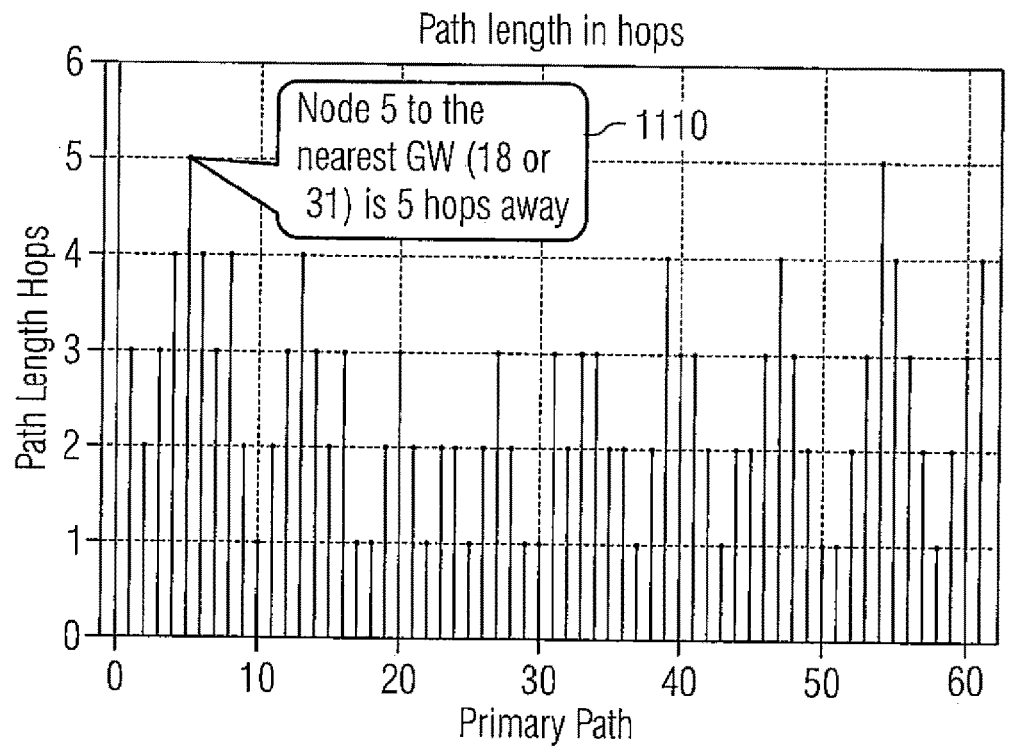
FIG. 11 is a chart illustrating primary paths path length.

In this example there are 64 nodes, three of them are GWs, so there are 61 primary paths. The set of primary paths form a small subset of all paths. These paths have various lengths (measured in hops) as shown in FIG. 11. Reference 1110 indicates that node 5 to the nearest GW (18 or 31) is five hops away.

Figure 12:
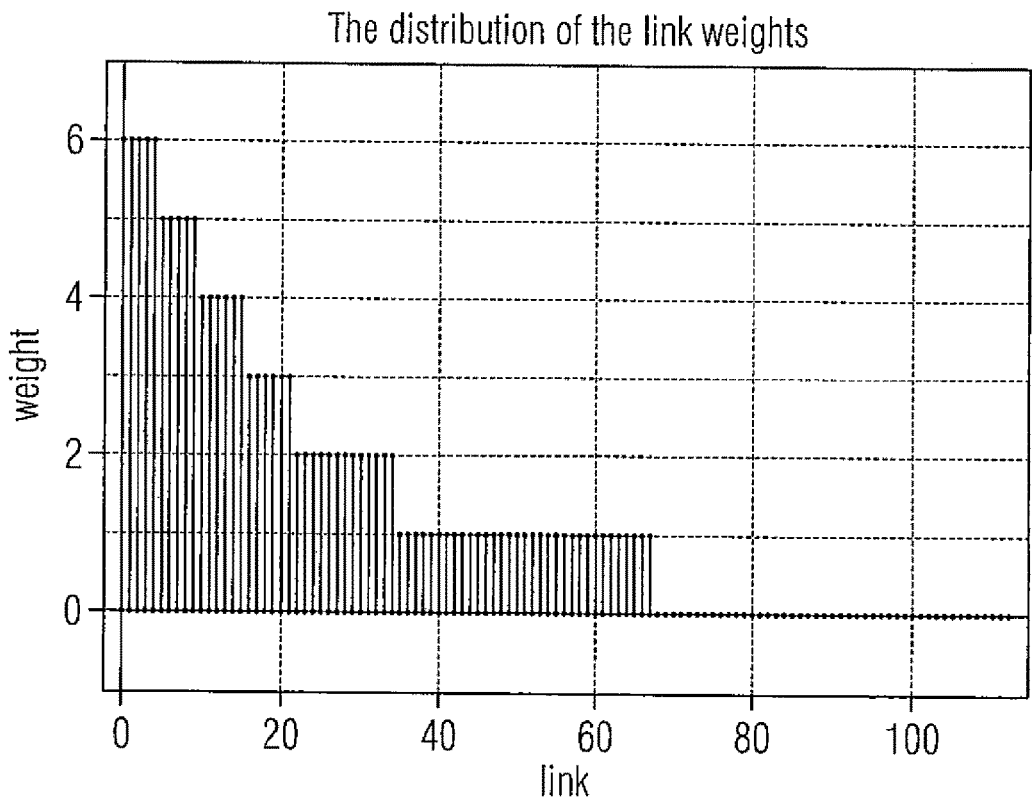
FIG. 12 is a chart illustrating link weight distribution.

This network graph has 112 links. The links are given a weight according to the number of primary paths that they carry. The links with higher weight are more important. The links are always handled in the order according to their weight. FIG. 12 shows the distribution of the link weights. The first 67 links carry at least one primary path and the remaining 45 links do not carry any primary paths (67+45=112).

Running the GreedyTwice[ ] method (described above) to tailor make 5 transmission sets for this example 8×8 grid small cell network:

$T_1$=GreedyTwice[Ø];
$T_2$=GreedyTwice[$T_1$], try to avoid links in $T_1$;
$T_3$=GreedyTwice[$T_1 \cup T_2$];

And this process is continued through additional transmission sets. In particular, the process ends when $T_1 \cup T_2 \cup T_3$ . . . contains every link and in this example, it ends at $T_5$.

Figure 13:
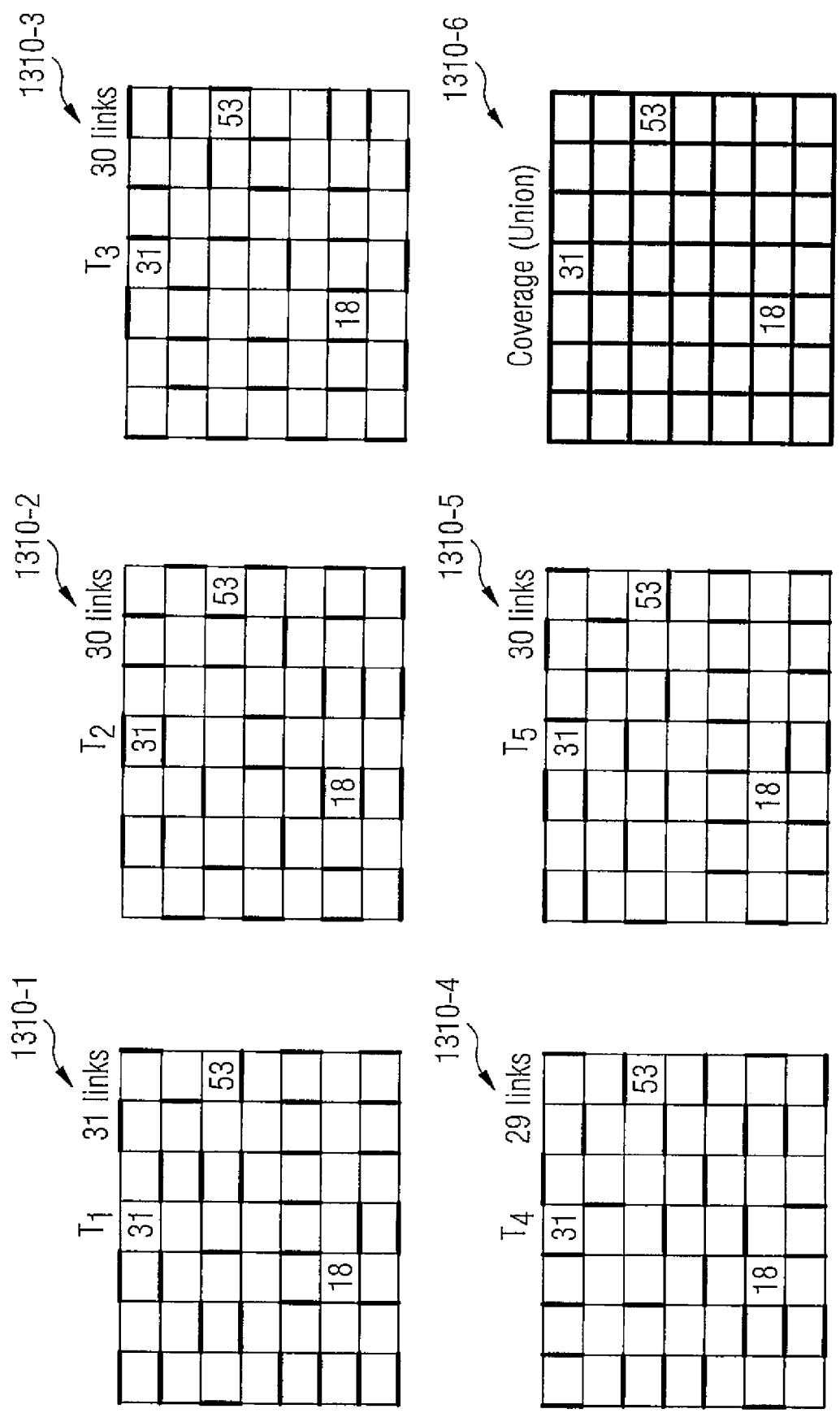
FIG. 13 is a visualization of the tailored transmission sets.

These transmission sets are as disjoint as possible and their union is the whole graph and it means they form good building blocks for the scheduling cycle. FIG. 13 shows the visualization of the tailored transmission sets: $T_1$ 1310-1, having 31 links; $T_2$ 1310-2, having 30 links; $T_3$ 1310-3, having 30 links; $T_4$ 1310-4, having 29 links; $T_5$ 1310-5, having 30 links; $T_6$ 1310-6, having all links. The links making up the corresponding transmission sets are in darker lines. Note that the transmission set $T_6$ 1310-6, which has all links, is marked in all darker lines.

Now we want to illustrate an example on how to arrive at a schedule cycle from the tailored transmission sets. The $a_{ij}$-entry of the matrix as shown in FIG. 14 contains the number of links common to both $T_i$ and $T_j$. The transmission sets $T_1$, $T_2$, $T_3$, and $T_4$ are almost disjoint while $T_5$ is similar to $T_1$ in the sense that they have 23 common links.

In this example 8×8 grid small cell network we have determined that we need a schedule cycle of 8 transmission sets (twice the max degree of GWs). So, now we need to tailor-make another three transmission sets. For example, $T_6$, $T_7$, and $T_8$ can be tailor-made as follows:

$T_6$=GreedyTwice[$T_1 \cap T_5 \cup Z$]

$T_7$=GreedyTwice[$(T_1 \cap T_5) \cup (T_1 \cap T_6) \cup (T_2 \cap T_5) \cup (T_2 \cap T_6) \cup Z$]

$T_8$=GreedyTwice[$\cup_{j=1}^{3} \cup_{i=1}^{3} (T_j \cap T_{4+i}) \cup Z$]

It is noted that Z is the set of those links whose weight is zero. Finally, a simple exhaustive search by shuffling of all these 8 transmission sets to determine the order in the scheduling cycle that can produce an optimal E2E delay for each node in this example 8×8 small cell grid network.

APPENDIX B. EXAMPLES OF ROUTING AND FAILURE RECOVERY SCHEMES

This Appendix contains additional information for routing schemes, and is also divided into a number of sections for ease of reference.

Concerning multiple disjoint spanning trees based routing, we first describe the WMN system architecture and examine the routing requirements for a WMN in the context of small-cell last-mile backhauling. We then specify possible multiple disjoint spanning trees (MDSTs) route computation algorithms.

A. WMN Routing in Small Cell Backhaul

Figure 15:
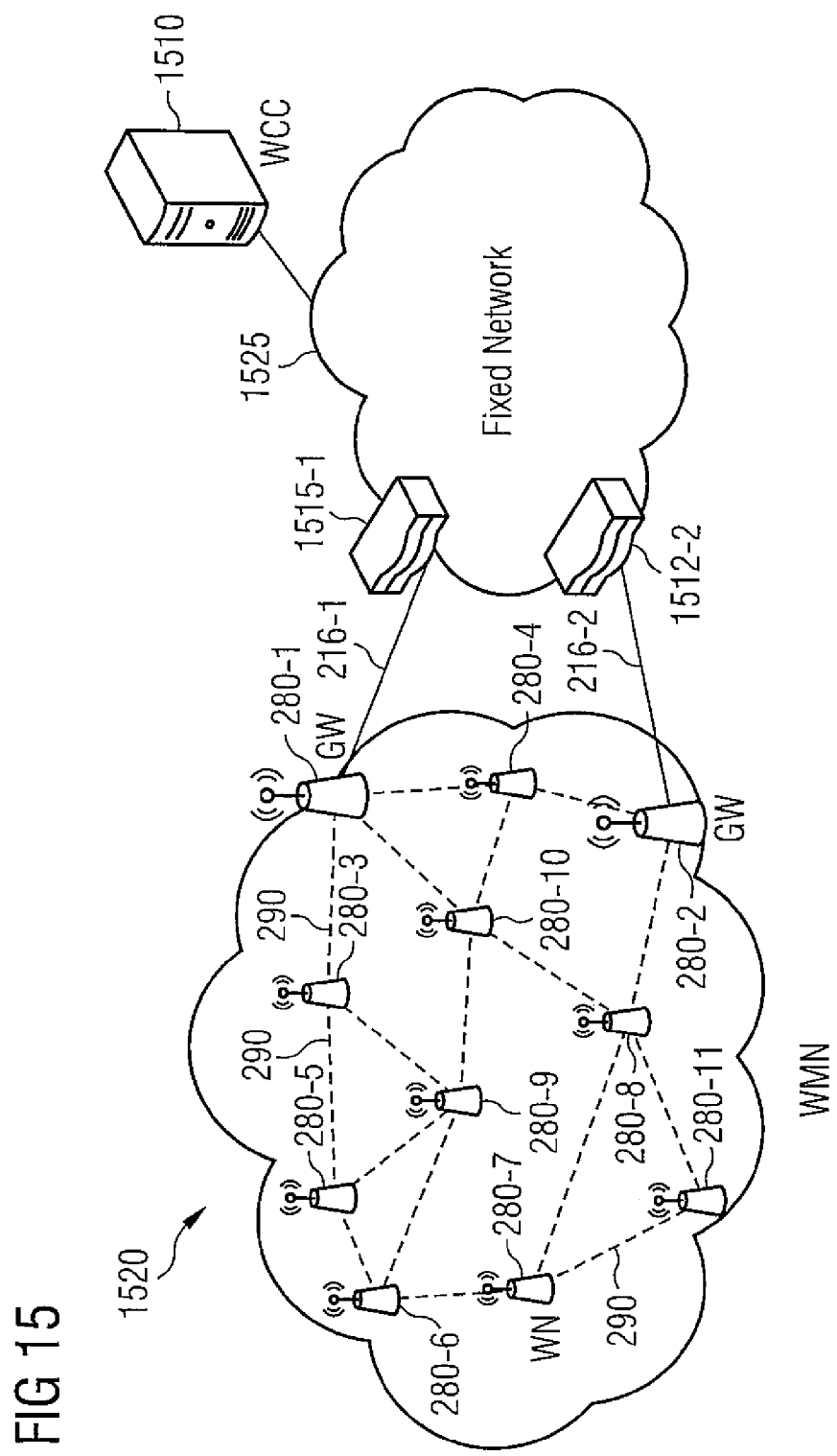
FIG. 15 illustrates an example of a WMN system architecture containing a WMN routing domain that is connected to a fixed network via gateway nodes (GW), where small cells are usually co-located with WMN nodes (WN) and GWs with macro cell sites.

Turning to FIG. 15, this figure illustrates an example of a WMN system architecture containing a WMN routing domain 1520 that is connected to a fixed network 225 via gateway nodes (GW) 280-1 and 280-2, where small cells 280-3 through 280-11 are usually co-located with WMN nodes (WN) and GWs with macro cell sites. Note that the nodes 280 may be considered to be eNBs 220. The GW nodes 280-1 and 280-2 are connected to the network nodes 1515-1 and 1515-2 (e.g., SGWs) through links 216-1 and 216-2. The network nodes 1515 connect to a fixed network 1525 (e.g., a core network). The WCC 1510 is also in or connected to the fixed network 1525. In terms of implementation of the WCC 1510, this could be implemented as the SON module 210 of FIG. 1.

Ordinary WMN nodes (WN) are connected to each other via point-to-point mmW links 290 and, as only the best links are used for communication, the topology is limited to partial mesh with rather low node degrees. In this example, the WCC 1510 takes care of path computation, link scheduling, and WMN topology management. The WCC 1510 can reside somewhere deeper in the fixed network 1525 or the WCC 1510 can be co-located with one of the GWs 280-1 or 280-2.

As previously described, in small-cell backhaul cases, the maximum number of nodes in a single WMN domain is likely to be in the order of several tens and thus only limited scalability is needed. For this reason, we have been able to make design choices that enable, e.g., faster reaction to failures but, at the same time, limit the scalability to a couple of 100s nodes. We do not consider this limitation as a serious drawback in this case as the capacity of a single GW can support only a limited number of small cells and a large, multi-GW WMN can be divided into smaller domains with only few GWs per domain. We are using specific WMN topology management algorithms for this purpose. The description of those algorithms is out of the scope of this document.

The utilization of GW links is one of the determining factors in WMN performance. As the most of the traffic flows into or out of the WMN via GWs 280-1 and 280-2, it is necessary to try to maximize GW link throughputs. Furthermore, GW links (the links 290 that connect to the GWs 280-1, 280-2) are the most likely locations for congestion and thus the load balancing and other congestion mitigation methods should be able to move traffic from a GW link to another. Therefore, we have decided to use a routing mechanism that is based on GW link specific spanning trees (ST). Each such ST is rooted at GW and the root has always only one child, which is one of the WNs neighboring the GW. In this way, moving traffic from a congested GW link means just allocating the traffic to another ST. Furthermore, if these STs are sufficiently disjoint, they should then provide the maximal number of disjoint paths to GW for any WN.

One of the most important performance metrics in 5G small cell backhaul is roundtrip delay, which depends not only on routing but also depends heavily on link scheduling. One approach to this problem is to separate routing and link scheduling tasks and to make the latter one easier by optimizing edge-to-edge delays only for a certain set of paths called primary paths. These primary paths are the best paths resulting from the MDST computation and they are given as an input to link schedule optimization procedure. The description of the link scheduling algorithm is out of the scope of this document.

B. MDST Computation

Figures 16, 17:
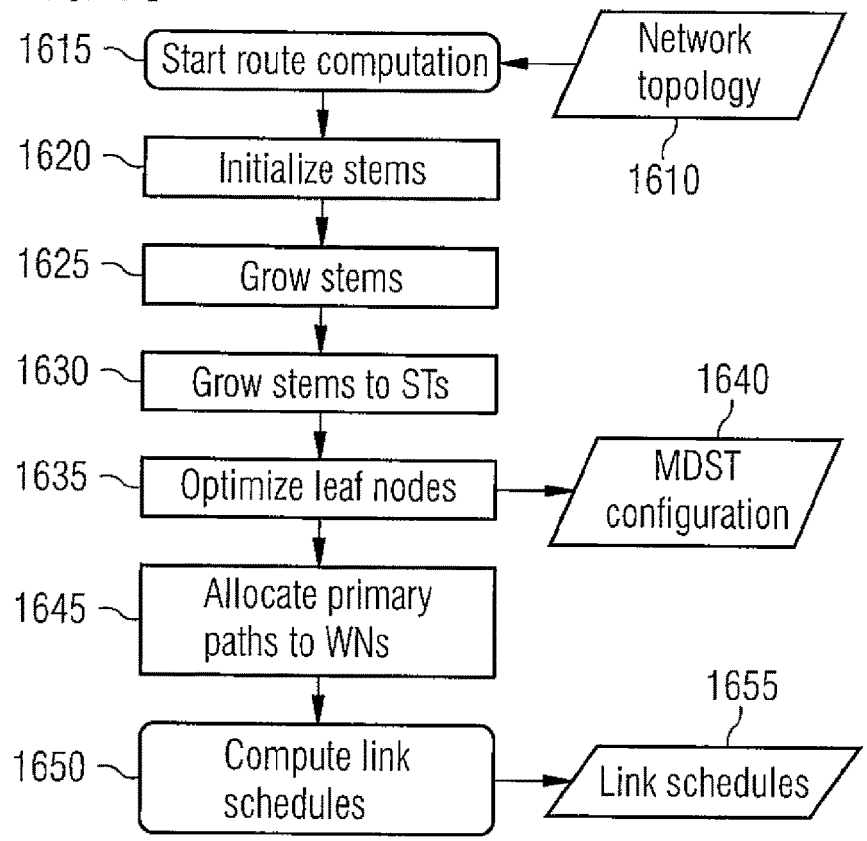
FIG. 16 is an example of an MDST computation procedure, and illustrates the operation of an example of a method, a result of execution of computer program instructions embodied on a computer readable memory, functions performed by logic implemented in hardware, and/or interconnected means for performing functions in accordance with certain examples of embodiments.
FIG. 17 is an example of a GENSTEMS initialization algorithm, which initializes a heap.

Here we present an example of a method of generating disjoint spanning trees by using centralized computation. Since in our case the link schedules are computed by a centralized element (WCC) it would make little sense to use distributed route computation. However, it would be trivial to transform the algorithm exemplified herein to a distributed version and thus description of such conversion is omitted here. The main procedure of the centralized MDST route computation algorithm is depicted in FIG. 16. This figure illustrates the operation of an example of a method, a result of execution of computer program instructions embodied on a computer readable memory, functions performed by logic implemented in hardware, and/or interconnected means for performing functions in accordance with certain examples of embodiments. It is noted this flow is performed by the WCC 1510, e.g., using the SON module 230-2 of a SON node 210.

MDST computation is started (block 1615) using provided network topology 1610 and by generating stems for each ST for one gateway. A stem is a part of ST that does not share any nodes (except the root that is shared by all STs) or links with other stems. It is noted that a spanning tree T of an undirected graph G is a subgraph that is a tree which includes all of the vertices of G. All nodes in the network except other root nodes should belong to some stem. By growing stems hop-by-hop in parallel at the same time, we can ensure that the final result of MDST computation contains STs that offer disjoint paths.

The stem growing step 1620 is started by creating a ST for each GW link and initializing (step 1620) a heap that is a key component in the ST computation algorithm. The initialization algorithm (GENSTEMS( )) is shown in FIG. 17. Here we assume that we have data structures for STs (mdst line 7 in FIG. 17) and heapitem. Each heapitem has three parameters id, parent and tree, which are needed when the heap item is processed.

Figures 18, 19:
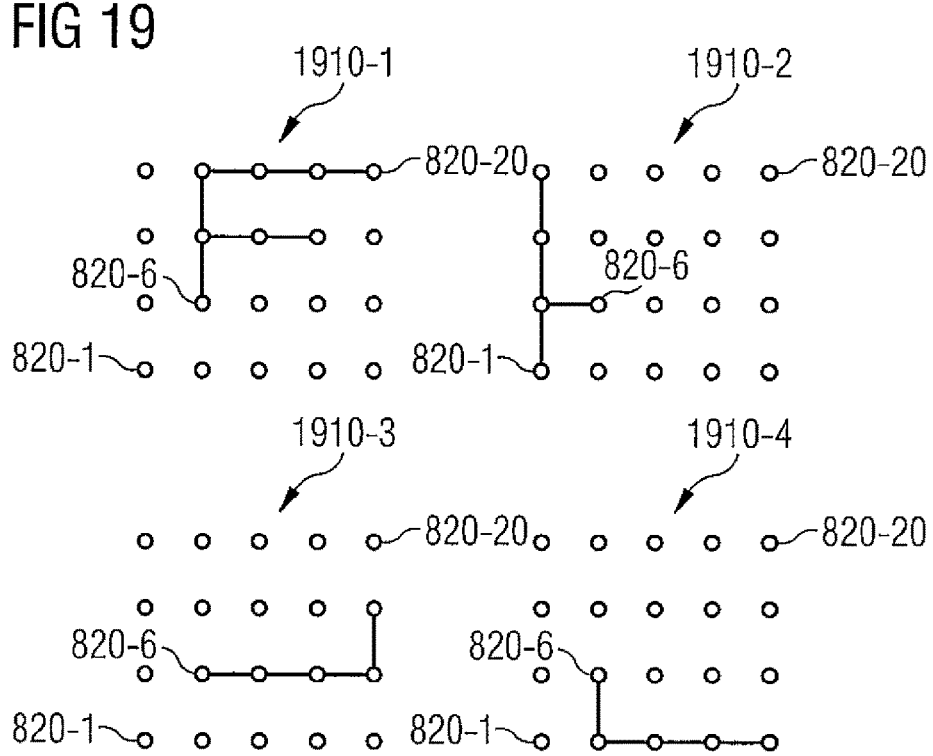
FIG. 18 is an example of a GROW procedure.
FIG. 19 is an example of stems generated for a 5×4 regular grid network of nodes with one GW, using the GROW procedure of FIG. 18.

After initialization, the GROW( ) procedure is called (see block 1625 of FIG. 16) to do the actual stem growing. The GROW procedure is shown in FIG. 18. The top items from the heap are processed one-by-one until the heap is empty. For each item, it is checked if the node is still unallocated and, if the node is, the node is added to ST as a child of the parent that is indicated by heapitem. Finally, the unallocated neighbors of the new tree member are added to the heap unless we consider that the new node should be only a leaf node (checked by continue( )). The intelligence of this algorithm is in having a suitable compare method for heapitem class, e.g., hop count or path cost to the root node can be used as the primary comparison key and cardinality of the tree as a secondary one. This means that, if e.g., hop count is used, the nodes are added to stems in the order of shortest path hop-counts.

FIG. 19 is an example of stems generated for a 5×4 regular grid network of nodes 820 with one GW 820-6, using the GROW procedure of FIG. 18. There are four stems 1910-1, 1910-2, 1910-3, and 1910-4.

Figures 20, 21:
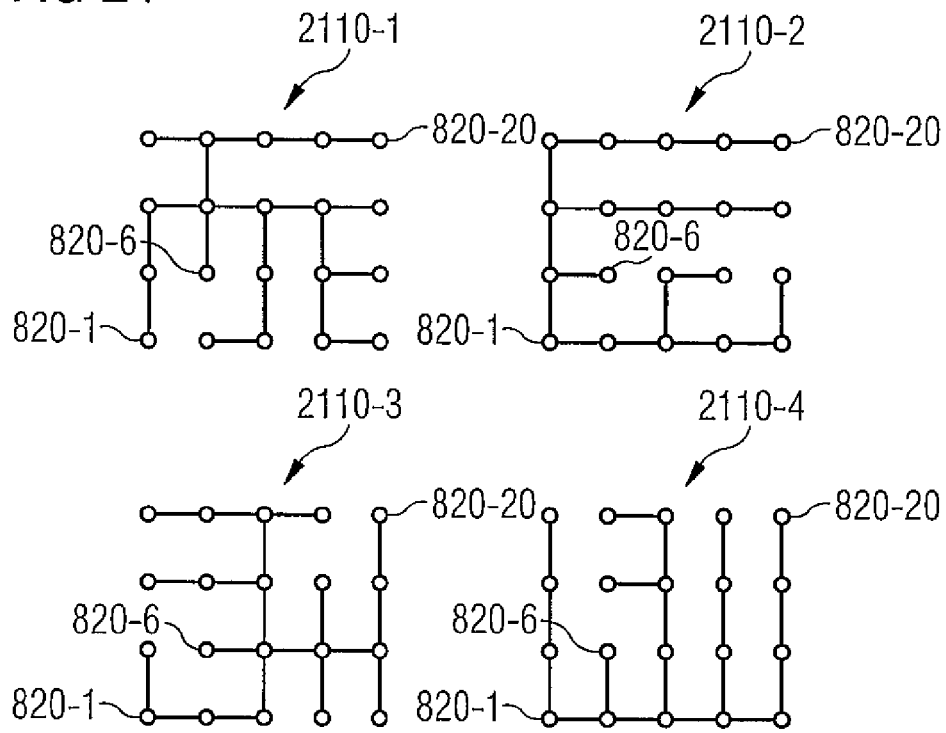
FIG. 20 is an example of a GENTREE procedure, which grows stems to full spanning trees.
FIG. 21 is an example of the stems of FIG. 19 grown to full spanning trees using the GENTREE procedure of FIG. 20.

As a final step, each stem is grown to full ST by utilizing the same GROW( ) procedure. See block 1630 of FIG. 16. In block 1635, the leaf nodes are optimized to produce the MDST configuration 1640. In block 1645, the primary paths are allocated to WNs, and link schedules are computed in block 1650, to produce link schedules 1655. As for growing each stem to a full ST, this is done by initializing the heap structure with the neighboring nodes of the stem (GENTREE( ) procedure shown in FIG. 20). The results of the GENTREE( ) procedure for a 5×4 regular grid network are shown in FIG. 21. The spanning trees 2110-1, 2110-2, 2110-3, and 2110-4 result from the Gentree( ) procedure and correspond to the stems 1910-1, 1910-2, 1910-3, and 1910-4, respectively. It is noted that to go from the gateway 820-6 to the node 820-20, there are five hops between these for spanning trees 2110-1 and 2110-3, and there are seven hops between these for spanning trees 2110-2 and 2110-4. Consequently, one of the spanning trees 2110-1 or 2110-3 will be selected as the primary path for node 820-20, and the other three spanning trees will be selected as backup paths for the node 820-20. There are multiple possibilities to select the primary path in case of tie. As examples, the following each separately or combined are possible:

1. Using node weight: the node with highest weight is selected, and node weight can be, e.g., default or determined by traffic statistics;
2. Expected traffic demand is shared as equally as possible between STs;
3. Stetson-Harrison method (i.e., by random assignment).

A principle behind the effort to balance traffic demands between STs is based on the assumption that, in a small cell backhaul system, the most of the traffic in WMN will go through GW nodes. In such a case, the GW links are the most likely locations for traffic congestion and, thus, it makes sense to try to spread the traffic between them. As each GW link belongs to only one ST, the spreading can be easily done by balancing the traffic between STs.

In those runs using GENTREE( ), hop count was used as the primary sorting key and the secondary key was an estimate of traffic load in GW links. For the estimate, it was assumed that the traffic flows travel through shortest paths and each WN produces the same demand. Using traffic load as a secondary key allows the stems with lighter load estimate grow larger than otherwise. However, in most of the cases, the impact on final MDST structure is not necessarily significant.

Because the GROW( ) procedure operates without a global view, it could diverge too greedily especially when called from GENTREE( ). Thus, the resulting trees can contain some suboptimal paths mainly in the most remote parts from the root node. This can be fixed with a simple optimization procedure TAILOPT( ) (see FIG. 22) that moves leaf nodes to a better parent if such is available.

C. Primary Path Allocation

The final phase of route computation is primary path allocation, in which the preferred GW and route to that GW are assigned for each node. This is done in two steps. First, the nodes that have only one clearly best path to one GW are allocated to those paths and GWs. In practice, the path allocation is done by defining primary ST for each node. Secondly, the nodes that have two or more equal cost paths are allocated so that the expected traffic demand is divided among STs as equally as possible. A default value for each node or a value determined by traffic statistics can be used.

The principle behind the effort to balance traffic demands between STs is based on the assumption that, in a small cell backhaul system, the most of the traffic in WMN will go through GW nodes. In such a case, the GW links are the most likely locations for traffic congestion and, thus, it makes sense to try to spread the traffic between them. As each GW link belongs to only one ST, the spreading can be easily done by balancing the traffic between STs. This makes also the active load-balancing quite easy: moving traffic from one, congested ST to another should automatically ease GW link congestion.

APPENDIX C. ADDITIONAL EXAMPLES AND COMMENTS

Concerning pre-calculation of elements, STs as well as link schedule may be pre-calculated for each domain by WCC, but they can be recalculated when network is active. The calculated routes and schedule information for a topology is distributed to all nodes in this domain before the information is used for decision making: the nodes will use this pre-calculated (e.g., semi-static) information and the collected (e.g., dynamic) status information about the link statuses (such as "ok", "congested", "broken") to do the forwarding, protection and load balancing action locally.

When the topology changes, e.g., new node is deployed or removed or one link is broken for a long period of time (see the final stage of multilevel protection scheme as described above), a WCC will re-calculate the routing paths and link schedule for this new changed topology. Traffic is then still on the old topology using the old mutes and schedule information. At a given time, e.g., ordered by the WCC, all nodes move synchronously from the old routes and schedule to use new routes and schedule, which is now optimized for this new topology.

Thus pre-computing means that the route options are calculated before they are used for re-routing decision making: the route options are already available when the forwarding/re-routing/load-balancing decision is performed in any of the nodes.

With "traffic statistics" for route calculation, it is meant that some general information exists, such as long term statistics about the traffic behavior (and/or traffic profile) in given area which for example network operators are collecting over a long period of time. For example, a certain hot spot area, e.g. city block, will face a heavy traffic during rush hours or at least more than other areas, etc. See FIG. 8 as an example. This (e.g., historical) information could be fed into the system to guide the route and/or link calculations. In principle, this information could be updated during operation through NMS and also collected by WCC, at least in some level.

This kind of traffic statistic could give a better set of initial routes and schedule than a default where all nodes are equal, and have the same priority and weight.

Dynamic, on-spot traffic information is used only by the nodes when performing local forwarding and load balancing decisions. The nodes monitor incoming data in ingress links and how much of the capacity is already used in each of their egress links and make forwarding decision based on that: If the primary path is operational, has enough capacity and is not congested, the primary routing path will be used. If not, the second backup routing path is selected and so on. (Remember that all the paths may be put into priority order in the route calculation process during the primary path selection.)

FIG. 24 is a logic flow diagram for performing self-organizing network concepts for small cells backhauling. FIG. 24 further illustrates the operation of an exemplary method, a result of execution of computer program instructions embodied on a computer readable memory, functions performed by logic implemented in hardware, and/or interconnected means for performing functions in accordance with examples of embodiments. FIG. 24 is typically performed by a node, such as an eNB 220, but may also be performed by a WCC that is distributed (e.g., as SON module 230-1 in the eNB 220 of FIG. 1). For ease of reference, it is assumed that the blocks for FIG. 24 are performed by a network node. It is noted in the examples that follow that the flow in FIG. 24 is referred to as example 1.

In block 2410, the node performs the following: in a mesh network comprising one or more domains of multiple nodes interconnected through links and in which there is at least one gateway in a selected domain connecting the selected domain to another network, wherein the one or more domains and their multiple nodes and their links are part of a topology, accessing a set of primary and backup routing paths for a selected one of the at least one gateways, wherein each primary and backup routing path for the selected gateway comprises a spanning tree that comprises the selected gateway and route to that selected gateway for nodes in the selected domain. In block 2420, the node performs accessing one or more schedules to be used by one or more of the nodes in the mesh network over one or more scheduling cycles. The node in block 2430 performs switching, based on status of one or more of the links between nodes and on the one or more schedules, to a selected one of the primary or backup routing paths for the selected gateway. In block 2440, the node performs causing routing in at least part of the mesh network to be modified based on the selected routing path.

FIG. 25 is a logic flow diagram for performing self-organizing network concepts for small cells backhauling. FIG. 25 further illustrates the operation of an exemplary method, a result of execution of computer program instructions embodied on a computer readable memory, functions performed by logic implemented in hardware, and/or interconnected means for performing functions in accordance with examples of embodiments. FIG. 25 is typically performed by a controller, such as a WCC (e.g., SON node 210) or other network controller. It is noted in the examples that follow that the flow in FIG. 25 is referred to as example 2.

In block 2510, the controller performs the following: in a mesh network comprising one or more domains of multiple nodes interconnected through links, wherein the one or more domains and their multiple nodes and their links are part of a topology, and wherein there is at least one gateway for a selected domain that connects the selected domain to another network, determining a set of primary and backup routing paths for a selected one of the at least one gateways, wherein each primary and backup routing path for the selected gateway comprises a spanning tree that comprises the selected gateway and route to that selected gateway for nodes in the selected domain. In block 2520, the controller performs the following: Performing the determining the set of primary and backup routing paths for any other gateways in the selected domain. The controller, in block 2530, performs determining one or more schedules to be used by the nodes in the mesh network over one or more scheduling cycles. In block 2540, the controller performs sending information to the nodes in the mesh network, wherein the information for a node describes at least the primary and backup routing paths for the nodes and the one or more schedules for the nodes for the selected domain.

Additional examples are as follows.

Example 3

The method of example 1 wherein the method further comprises determining the set of primary and backup routing paths for the selected gateway, or the method of example 2, wherein determining the set of primary and backup routing paths for the selected gateway is performed by performing at least the following:

assigning links immediately adjacent to the selected gateway as stems of a tree, which are connected to the root of the tree, and the root is the selected gateway;

growing each stem into branches until a union of all branches includes the nodes in the selected domain; and grow each branch until a full spanning tree results that covers the selected domain.

Example 4

The method of example 3, further comprising optimizing leaf nodes in the branches at least by moving a leaf node to an other parent node if moving the leaf node to the other parent node via a direct hop link to the parent node results in a smaller hop count.

Example 5

The method of any one of examples 3 or 4, wherein the number of spanning trees is equal to the number of stems, which is equal to the number of routes per node to the selected gateway.

Example 6

The method of any one of examples 3 to 5, further comprising for each node in the selected domain, identifying a priority of multiple paths in the spanning trees to the selected gateway at least by:

setting a highest priority to a path that is lowest in number of hop counts to the selected gateway;

breaking a tie in an equal hop count situation to set one path in the situation as a higher priority path; and the path with the highest priority is called the primary path.

Example 7

The method of example 6, wherein breaking the tie further comprises breaking the tie by using one or more of the following: weight of the node; expected traffic demand is shared as equally as possible between spanning trees; and random assignment.

Example 8

The method of any one of examples 1 to 7, further comprising optimizing the link schedules for the primary and backup routing paths.

Example 9

The method of any one of examples 1 to 8, wherein:

for each of the one or more domains that comprise a plurality of gateways:

the accessing a set of primary and backup routing paths, the accessing one or more schedules, the switching and the causing routing are performed for each of the plurality of gateways in the domain; and the spanning trees for each of the plurality of gateways span the nodes in the corresponding domain.

Example 10

The method of any one of examples 1 to 9, wherein the one or more schedules comprise constructed transmission sets that are ordered into a cyclic schedule.

Example 11

The method of anyone of examples 1 to 10, further comprising determining one or more schedules to be used by one or more of the nodes in the mesh network over one or more scheduling cycles at least by constructing transmission sets and ordering the constructed transmission sets into a cyclic schedule.

Example 12

The method of example 10, wherein the constructing and ordering the transmission sets comprises one or more of the following:

in each schedule cycle, each link should be given at least one chance for transmission;

some links are more considered to be important than other links and should be given more chances in each schedule cycle;

identifying and constructing a transmission set in each slot of a scheduling cycle, where the transmission set is constructed with a highest number of disjoint links that can be active at a same time moment;

identifying a minimal number of slots per cycle that can cover all links in the mesh network; and/or assigning a transmission set to each slot of the scheduling cycle by identifying the order of the transmission sets in the schedule cycle to ensure an end-to-end delay.

Example 13

The method of any one of examples 1 to 12, performed by a certain node in the mesh network, and wherein the method further comprises the certain node using virtual connections and traffic flows to transfer received client data over links in the mesh network.

Example 14

The method of example 13, wherein using virtual connections comprises mapping incoming traffic for the client data into virtual connections that are identified by virtual connection identifiers.

Example 15

The method of any one of examples 13 or 14, wherein using virtual connections and traffic flows further comprises encapsulating the user data is encapsulated into frame that comprises a header comprising the following fields:

| Field | Purpose |
| --- | --- |
| WNID | Destination mesh network ID |
| STID | Spanning tree ID |
| VCID | Flow ID |
| PRIO | Flow priority |
| RRCTR | Re-route counter |
| SEQ | Sequence number (optional) | wherein ID = identification.

Example 16

The method of anyone of examples 1 to 15, performed by a certain node, wherein the certain node handles traffic as flows, wherein the flows are separated by quality of service priority identification and virtual connection identification, and the switching causes local forwarding of traffic using pre-calculated route alternatives from the primary and backup routing paths and based on local load and congestion status information.

Example 17

The method of example 16, wherein the local forwarding further comprises one or more of the following:
 selecting by an ingress node as the certain node a path from the primary and backup routing paths by using pre-computed path preferences and status of a bottleneck link in each path;
 making different forwarding decisions based on each priority class;
 making forwarding decisions using local forwarding tables comprising a best available path based on preferences set by route computation;
 forming and maintaining a local forwarding table based on topology configuration information and network status information, comprising updating the table every time a new topology configuration is received and every time new status information is received from the network indicating one or more link failures, link congestion and/or other anomalies;
 estimating by an ingress node as the certain node the applicability of alternative routing paths for each traffic flow through the ingress node;
 inspecting by an intermediate node as the certain node only a spanning tree identifier and mesh network identifier when making forwarding decisions;
 assigning frames into correct queues at an output port based on priority information; and/or
 using strict priority queuing as a target to force lower priority traffic to alternate paths instead of sharing capacity in a bottleneck link, wherein the using occurs such that the sharing is performed in a fair manner.

Example 18

The method of any one of examples 1 to 17, wherein the switching performs one or more on-demand dynamic load balancing methods comprising one or more of the following:
 path re-selection load balancing is applied only at ingress nodes, and intermediate nodes do not change an originally selected path;
 based on path status information, an alternative pre-computed path is selected from a priority list;
 path re-selection load balancing is flow based, and a complete flow is redirected to an alternative path;
 path re-selection load balancing is priority based, and a highest priority flow gets first the most optimum routing path, the second highest priority flow gets the next best available route, with this process continuing through remaining flows;
 in path re-selection load balancing, higher priority traffic flow overrides lower priority traffic flow or higher priority traffic flow overrides and pre-empts lower priority traffic flow;
 inverse multiplexing based load balancing is applied to balance low priority bulk and best effort traffic on a packet-based fashion;
 inverse multiplexing based load balancing is applied only for lower priority traffic;
 in inverse multiplexing based load balancing, all available paths are used;
 inverse multiplexing based load balancing is packet based, wherein each incoming packet is directed to a least congested path; and/or
 packets are sequence numbered and re-ordering is performed at domain egress nodes.

Example 19

The method of any one of examples 1 to 18, wherein the switching and causing routing further comprises implementing a hierarchical fault recovery system wherein a primary action is to re-route traffic to an alternate pre-computed routing path in case of a fault in one or more spanning trees, and a secondary action is to restore broken spanning trees.

Example 20

The method of example 19, wherein fault detection is event-based and wherein a fault triggers a link state update message that is broadcast from a point of failure to all nodes in the mesh network.

Example 21

The method of any one of examples 19 or 20, wherein implementing a hierarchical fault recovery system further comprises performing fast local rerouting, in which traffic that is to be transmitted on the broken link is re-directed along an alternate pre-computed routing path, whereby nodes at a point of failure start to reroute packets along ad hoc by-pass path segments towards desired destinations.

Example 22

The method of example 21, wherein performing fast local rerouting further comprises performing a reselect spanning tree method, comprising one or more of:

each node maintains path preferences to each destination node in the mesh network routing domain;

preferences of the primary routing paths between gateways and nodes have been assigned and configured by a centralized controller;

path preferences between nodes are calculated by the nodes themselves according to hop counts via spanning trees;

the path preferences are updated every time a node receives a new muting configuration or a link quality change report;

if the current path of a packet is blocked by a broken link, the path preferences are checked for an alternative spanning tree to a packet destination via an operational link on the node and if an alternative spanning tree is found, the packet is rerouted via that alternative spanning tree.

Example 23

The method of example 22, wherein if there are no alternative spanning trees to the packet destination or if the alternative spanning trees would lead to paths with very suboptimal delay, hop count or capacity, a toss-to-neighbor procedure is used, wherein the packet is sent over an operational link, not necessarily belonging to any of the pre-computed paths, to a neighbor that can route the packet to the destination via the packet's original spanning tree using the following:

the eligible neighbors for each broken link and affected spanning tree-destination node pair are calculated by each node on configuration or link status change, and the selection rules are:

a link between the toss-to-neighbor node and this node does not belong to the failed spanning tree; and a path between toss-to-neighbor node and destination node does not contain this node.

Example 24

The method of any one of examples 21 to 23, wherein performing fast local rerouting further comprises path re-selection in which a corrective route is selected based on a local forwarding table by a next available path from a priority list.

Example 25

The method of example 24, wherein performing fast local rerouting further comprises performing local spanning tree repair in response to the path failure being persistent or there are multiple concurrent faults in the network, wherein local correction to the routing paths will be made comprising one or more of the following:

a broken link in a spanning tree is replaced with an operational link not originally belonging to the spanning tree;

signaling among involved nodes results in local re-arrangement of a routing structure;

each node maintains information about potential replacement links in case one of its upstream links on a path to a gateway would break, and the nodes update this information on routing topology changes;

for each broken spanning tree, suitable replacement candidates are the links directly connecting a node to upstream and another node to downstream along the spanning tree from the breaking point;

a local spanning tree repair procedure is initiated by an initiating node with a broken link towards the gateway, and the initiating node sends a signal to activate the repairing link to a downstream end-point repairing node of the link; and/or the repairing node updates its forwarding preferences and muting to use the new link and notifies the other nodes of the repaired spanning tree.

Example 26

The method of example 25, wherein performing fast local rerouting further comprises, in response to a failure situation lasting a long time that is considered to be permanent, all the routing paths are re-computed, one or more new schedules are computed, and the entire network is re-configured based on the re-computed routing paths and the computed one or more new schedules.

Example 27

The method of any one of examples 1 to 26, further comprising distributing local failure identification and link status information within the network.

Example 28

The method of example 27, wherein distributing local failure identification and link status information within the network further comprises one or more of the following:

both link and path statuses are monitored;

operational status of a link is based on status indications received from a wireless physical layer;

periodic Hello messaging is used to verify the reachability to the neighbor nodes, over all links to all neighbors;

congestion is primarily estimated by the priority-specific output queue lengths;

) the link status information is distributed in the whole mesh network using link state update messages, wherein a node sends a link state update message when the node detects a significant link status change or a change in the traffic load on the link;

a link state update message is propagated in a control plane along a spanning tree specified in the link state update message, and wherein each node forwards a received link state update message to its own neighbors, except for the neighbor from which the link state update message was received; and/or for each link state event, the node sends a link state update message along all spanning trees that traverse the link in concern.

Example 29

The method of any one of examples 1 to 28, wherein the method supports both unidirectional and bidirectional client traffic.

Example 30

The method of any one of examples 1 to 29, wherein the method supports routing of upstream and downstream directions of bidirectional traffic either through the same routing path or through different routing paths.

Example 31

The method of anyone of examples 1 to 30, wherein the method further comprises performing at least the switching and causing routing to be performed base in part on energy optimization.

Example 32

The method of example 31, wherein the energy optimization comprises one or more of the following:

executing an energy-saving control module that takes care of energy-saving at node and link level;

operation of the energy-saving control module is coordinated with a client layer, comprising indicating which client nodes are potential sleepers;

the energy-saving control module learns which client nodes are potential sleepers by itself;

the energy-saving control module proposes potential sleepers to the client layer;

a node can request a shutdown based on its internal self-diagnostics;

when potential sleeping nodes are indicated, the nodes will be forced to be leaf nodes at all spanning trees to allow for putting a node to sleep without affecting ongoing traffic;

new topology configuration information is distributed and after activation the node is put into sleep;

a wake up procedure is performed based on certain criteria;

link level energy saving is taken into account in topology optimization; and/or the energy-saving control module process is also followed for maintenance purposes and provides a graceful shutdown of a node without a need to activate protection schemes.

Example 33

The method of example 2, wherein:

the topology is a first topology, and wherein one or more changes occur in the mesh network to create a second topology;

the method further comprises re-performing the determining the set of primary and backup routing paths for all gateways in the selected domain, and re-performing the determining the one or more schedules; and the sending the information is performed in such a way to synchronize transfer from the first topology configuration to the second topology configuration.

Example 34

The method of any of the previous examples, wherein the mesh network is a wireless mesh network.

Example 35

The method of any of the previous examples, wherein the mesh network is a wireless mesh network and the multiple nodes communicate with each other using millimeter wave links.

Example 36

The method of any one of examples 1 to 33, performed in an optical mesh network.

Example 37

An apparatus, comprising:

means, in a mesh network comprising one or more domains of multiple nodes interconnected through links and in which there is at least one gateway in a selected domain connecting the selected domain to another network, wherein the one or more domains and their multiple nodes and their links are part of a topology, accessing a set of primary and backup routing paths for a selected one of the at least one gateways, wherein each primary and backup routing path for the selected gateway comprises a spanning tree that comprises the selected gateway and route to that selected gateway for nodes in the selected domain;

means for accessing one or more schedules to be used by one or more of the nodes in the mesh network over one or more scheduling cycles;

means for switching, based on status of one or more of the links between nodes and on the one or more schedules, to a selected one of the primary or backup routing paths for the selected gateway; and means for causing routing in at least part of the mesh network to be modified based on the selected routing path.

Example 38

An apparatus, comprising:

means, in a mesh network comprising one or more domains of multiple nodes interconnected through links, wherein the one or more domains and their multiple nodes and their links are part of a topology, and wherein there is at least one gateway for a selected domain that connects the selected domain to another network, determining a set of primary and backup routing paths for a selected one of the at least one gateways, wherein each primary and backup routing path for the selected gateway comprises a spanning tree that comprises the selected gateway and route to that selected gateway for nodes in the selected domain;

means for performing the determining the set of primary and backup routing paths for any other gateways in the selected domain;

means for determining one or more schedules to be used by the nodes in the mesh network over one or more scheduling cycles; and means for sending information to the nodes in the mesh network, wherein the information for a node describes at least the primary and backup routing paths for the nodes and the one or more schedules for the nodes for the selected domain.

Example 39

The apparatus of any one of examples 37 or 38, further comprising means for performing any of the methods of examples 3 to 36.

Example 40

A base station comprising the apparatus of any one of examples 37 to 39.

Example 41

A mesh network centralized controller comprising the apparatus of any one of examples 37 to 39.

Example 42

A communications network comprising one or more of the apparatus of any one of examples 37 to 39.

Example 43

A computer program comprising program code for executing the method according to any of examples 1 to 36.

Example 44

The computer program according to example 43, wherein the computer program is a computer program product comprising a computer-readable medium bearing computer program code embodied therein for use with a computer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

5G fifth generation
AAA authentication, authorization and accounting
BER bit error rate
BGP border gateway protocol
BTS base transceiver station
CAPEX capital expenditures
CCS Cambridge communication systems
CPU central processing unit
CN core network
DiffServ differentiated services
DSCP differentiated service code point
DS-TE DiffServ aware traffic engineering (e.g., MPLS)
E2E end-to-end
ECM energy-saving control module
eNB (or eNodeB) evolved Node B (e.g., an LTE base station)
ES energy saving
FRR fast reroute (e.g., MPLS)
FLRR fast local re-routing
Gbit/s gigabits per second
GiMMiC Gbit/s MWR micromesh cloud concept
GMPLS generalized MPLS
GNSS global navigation satellite system
GW gateway (e.g., node)
HetNet heterogeneous network
HW hardware
HWMP hybrid wireless mesh protocol
ID identifier
I/F interface
IGPs interior gateway protocol
ILP integer linear programming
IMLB inverse multiplexed load balancing
IMPEX implementation expenditures
IN initiating node
IntServ integrated services
IP Internet protocol
IS-IS intermediate system to intermediate system
LDP label distribution protocol
LP linear programming
LSP label switch path
LSTR local spanning tree repair
LSU link state update
LTE long term evolution
LTE-A long term evolution-advanced
MAC media access control
max maximum
MBit/s megabits per second
MME mobility management entity
mmW millimeter wave
MPLS multiprotocol label switching
ms milliseconds
NMS network management system
N/W network
OAM operation, administration and maintenance
OPEX operational expenditures
OSPF open shortest path first
PB provider bridging
PBB provider backbone bridging
PBB-TE provider backbone bridging-traffic engineering
PCE path computation element
PCP priority code point
PM performance monitoring
PRIO flow priority field
L2 layer 2 (e.g., the data link layer)
L3 layer 3 (e.g., the network layer)
QoS quality of service
RF radio frequency
RN repairing node
RRCTR re-route counter field
RST re-select spanning tree
RVSP-TE resource reservation protocol traffic engineering
Rx receiver
SCTP stream control transmission protocol SDH synchronous digital hierarchy
SEQ sequence number field
SGW serving gateway
SON self-organizing network
ST spanning tree
STDMA spatial time division multiple access
STID spanning tree identifier
SW software
SWMN static wireless mesh network, also self-organizing wireless mesh network
T2N toss to neighbor
TCO total cost of ownership
TCP transmission control protocol
TCR topology change report
TDD time division duplex
TDMA time division multiple access
TE traffic engineering
UDP user datagram protocol
Tx transmitter
UDP user datagram protocol
UE user equipment (e.g., a wireless, typically mobile device)
VC virtual connection
VCID virtual connection (flow) identifier
VPN virtual private network
VTT Technical Research Centre of Finland
WCC WMN centralized controller
MDST multiple disjoint spanning tree
WFQ weighted fair queuing
WMN wireless mesh network
WN WMN node
WNID WMN node ID

What is claimed is:

1. A method comprising:

in a mesh network comprising one or more domains of multiple nodes interconnected through links and including at least one gateway in a selected domain connecting the selected domain to another network, wherein the one or more domains and their multiple nodes and their links are part of a topology, accessing a set of primary and backup routing paths for a selected one of the at least one gateways, wherein the topology is determined at least in part by one of splitting or merging the one or more domains and indicating whether at least one new gateway should be associated with the one or more domains following the one of splitting or merging, wherein each primary and backup routing path for the selected gateway comprises a spanning tree that comprises the selected gateway and route to that selected gateway for nodes in the selected domain, wherein the nodes comprise small cells providing access by user equipment to the another network through backhaul to the gateway, and wherein the gateway comprises a macro cell accessing each of the multiple nodes in the selected domain via at least the backhaul;

accessing a link schedule to be used at least by the multiple nodes in the selected domain in the mesh network, the link schedule comprising transmission sets comprising disjoint links that can be active simultaneously, and the transmission sets are ordered into a schedule cycle by one or more of the following:

identifying and constructing one of the transmission sets in each slot of the scheduling cycle, where the one of the transmission sets is constructed with a highest number of the disjoint links that can be active simultaneously;

identifying a minimal number of slots per cycle that can cover all links in the mesh network; or assigning one of the transmission sets to each slot of the scheduling cycle by identifying the order of the transmission sets in the scheduling cycle to ensure an end-to-end delay;

switching, based on status of one or more of the links for one or more of the multiple nodes in the selected domain and on the link schedule, to a selected one of the primary or backup routing paths for the selected gateway; and causing routing in at least part of the mesh network in the selected domain to be modified based on the selected routing path.

2. The method of claim 1 wherein the method further comprises determining the set of primary and backup routing paths for the selected gateway, wherein determining the set of primary and backup routing paths for the selected gateway is performed by performing at least the following:

assigning links immediately adjacent to the selected gateway as stems of a tree, which are connected to the root of the tree, and the root is the selected gateway;

growing each stem into branches until a union of all branches includes the nodes in the selected domain; and grow each branch until a full spanning tree results that covers the selected domain.

3. The method of claim 2, further comprising optimizing leaf nodes in the branches at least by moving a leaf node to another parent node if moving the leaf node to the another parent node via a direct hop link to the parent node results in a smaller hop count.

4. The method of claim 2, wherein the number of spanning trees is equal to the number of stems, which is equal to the number of routes per node to the selected gateway.

5. The method of claim 2, further comprising for each of the multiple nodes in the selected domain, identifying a priority of multiple paths in the spanning trees to the selected gateway at least by:

setting a highest priority to a path that is lowest in number of hop counts to the selected gateway;

breaking a tie in an equal hop count situation to set one path in the situation as a higher priority path; and the path with the highest priority is called the primary path.

6. The method of claim 5, wherein breaking the tie further comprises breaking the tie by using one or more of the following: weight of the node; expected traffic demand is shared as equally as possible between spanning trees; and random assignment.

7. The method of claim 1, wherein for each of the one or more domains that comprise a plurality of gateways:

the accessing a set of primary and backup routing paths, the accessing a link schedule, the switching and the causing routing are performed for each of the plurality of gateways in the domain; and the spanning trees for each of the plurality of gateways span the nodes in the corresponding domain.

8. The method of claim 1, further comprising determining the link schedule to be used by one or more of the nodes in the mesh network to implement the one or more scheduling cycles at least by constructing the transmission sets and ordering the constructed transmission sets into the schedule cycle.

9. The method of claim 8, wherein the constructing and ordering the transmission sets comprises the following:

in each schedule cycle, each link should be given at least one chance for transmission; and some links are considered to be more important than other links and should be given more chances in each schedule cycle.

10. The method of claim 1, performed by a certain node in the mesh network, and wherein the method further comprises the certain node using virtual connections and traffic flows to transfer received client data over links in the mesh network.

11. The method of claim 10, wherein using virtual connections comprises mapping incoming traffic for the client data into virtual connections that are identified by virtual connection identifiers.

12. The method of claim 1, performed by a certain node, wherein the certain node handles traffic as flows, wherein the flows are separated by quality of service priority identification and virtual connection identification, and the switching causes local forwarding of traffic using pre-calculated route alternatives from the primary and backup routing paths and based on local load and congestion status information.

13. The method of claim 12, wherein the local forwarding further comprises one or more of the following:
selecting by an ingress node as the certain node a path from the primary and backup routing paths by using pre-computed path preferences and status of a bottleneck link in each path;
making different forwarding decisions based on each priority class;
making forwarding decisions using local forwarding tables comprising a best available path based on preferences set by route computation;
forming and maintaining a local forwarding table based on topology configuration information and network status information, comprising updating the table every time a new topology configuration is received and every time new status information is received from the network indicating one or more link failures, link congestion and/or other anomalies;
estimating by an ingress node as the certain node the applicability of alternative routing paths for each traffic flow through the ingress node;
inspecting by an intermediate node as the certain node only a spanning tree identifier and mesh network identifier when making forwarding decisions;
assigning frames into correct queues at an output port based on priority information; and/or
using strict priority queueing as a target to force lower priority traffic to alternate paths instead of sharing capacity in a bottleneck link, wherein the using occurs such that the sharing is performed in a fair manner.

14. The method of claim 1, wherein the switching performs one or more on-demand dynamic load balancing methods comprising one or more of the following:
path re-selection load balancing is applied only at ingress nodes, and intermediate nodes do not change an originally selected path;
based on path status information, an alternative pre-computed path is selected from a priority list;
path re-selection load balancing is flow based, and a complete flow is redirected to an alternative path;
path re-selection load balancing is priority based, and a highest priority flow gets first the most optimum routing path, the second highest priority flow gets the next best available route, with this process continuing through remaining flows;
in path re-selection load balancing, higher priority traffic flow overrides lower priority traffic flow or higher priority traffic flow overrides and pre-empts lower priority traffic flow;
inverse multiplexing based load balancing is applied to balance low priority bulk and best effort traffic on a packet-based fashion;
inverse multiplexing based load balancing is applied only for lower priority traffic; in inverse multiplexing based load balancing, all available paths are used;
in inverse multiplexing based load balancing is packet based, wherein each incoming packet is directed to a least congested path; and/or
packets are sequence numbered and re-ordering is performed at domain egress nodes.

15. The method of claim 1, wherein a scheduling cycle in the one or more scheduling cycles comprises different transmission sets of active links using the multiple nodes in the selected domain and an order of the different transmission sets.

16. The method of claim 1, wherein the transmission sets are ordered into a schedule cycle by all of the following:
identifying and constructing one of the transmission sets in each slot of the scheduling cycle, where the one of the transmission sets is constructed with a highest number of the disjoint links that can be active simultaneously;
identifying a minimal number of slots per cycle that can cover all links in the mesh network; and
assigning one of the transmission sets to each slot of the scheduling cycle by identifying the order of the transmission sets in the scheduling cycle to ensure an end-to-end delay.

17. The method of claim 1, wherein the nodes connect to each other through line-of-sight backhaul connections.

18. The method of claim 17, wherein the nodes are equipped with a backhaul radio that can only be steered to one neighboring node at a time.

19. An apparatus including one or more processors and one or more memories including computer program code configured to with the one or more processors, cause the apparatus to:
in a mesh network comprising one or more domains of multiple nodes interconnected through links and including at least one gateway in a selected domain connecting the selected domain to another network, wherein the one or more domains and their multiple nodes and their links are part of a topology, access a set of primary and backup routing paths for a selected one of the at least one gateways, wherein the topology is determined at least in part by one of splitting or merging the one or more domains and indicating whether at least one new gateway should be associated with the one or more domains following the one of splitting or merging, wherein each primary and backup routing path for the selected gateway comprises a spanning tree that comprises the selected gateway and route to that selected gateway for nodes in the selected domain, wherein the nodes comprise small cells providing access by user equipment to the another network through backhaul to the gateway, and wherein the gateway comprises a macro cell accessing each of the multiple nodes in the selected domain via at least the backhaul;
access a link schedule to be used at least by the multiple nodes in the selected domain in the mesh network, the link schedule comprising transmission sets comprising disjoint links that can be active simultaneously, and the transmission sets are ordered into a schedule cycle by one or more of the following:
  identifying and constructing one of the transmission sets in each slot of the scheduling cycle, where the one of the transmission sets is constructed with a highest number of the disjoint links that can be active simultaneously;
  identifying a minimal number of slots per cycle that can cover all links in the mesh network; or
  assigning one of the transmission sets to each slot of the scheduling cycle by identifying the order of the transmission sets in the scheduling cycle to ensure an end-to-end delay;
switch, based on status of one or more of the links for one or more of the multiple nodes in the selected domain and on the link schedule, to a selected one of the primary or backup routing paths for the selected gateway; and
cause routing in at least part of the mesh network in the selected domain to be modified based on the selected routing path.

20. An apparatus including one or more processors and one or more memories including computer program code configured to, with one or more processors, cause the apparatus to:
  in a mesh network comprising one or more domains of multiple nodes interconnected through links, wherein the one or more domains and their multiple nodes and their links are part of a topology, and wherein at least one gateway for a selected domain is configured to connect the selected domain to another network, determine a set of primary and backup routing paths for a selected one of the at least one gateways, wherein the topology is determined at least in part by one of splitting or merging the one or more domains and indicating whether at least one new gateway should be associated with the one or more domains following the one of splitting or merging, wherein the selected gateway is configured to access the multiple nodes in the selected domain, and wherein each primary and backup routing path for the selected gateway comprises a spanning tree that comprises the selected gateway and route to that selected gateway for nodes in the selected domain, wherein the nodes comprise small cells providing access by user equipment to the another network through backhaul to the gateway, and wherein the gateway comprises a macro cell accessing each of the nodes in the selected domain via at least the backhaul;
  determine a link schedule to be used at least by the multiple nodes in the selected domain in the mesh network, the link schedule comprising transmission sets comprising disjoint links that can be active simultaneously, and the transmission sets are ordered into a schedule cycle by one or more of the following:
    identifying and constructing one of the transmission sets in each slot of the scheduling cycle, where the one of the transmission sets is constructed with a highest number of the disjoint links that can be active simultaneously;
    identifying a minimal number of slots per cycle that can cover all links in the mesh network; or
    assigning one of the transmission sets to each slot of the scheduling cycle by identifying the order of the transmission sets in the scheduling cycle to ensure an end-to-end delay; and
  send information to at least the nodes in the selected domain in the mesh network, wherein the information for a node in the selected domain describes at least the primary and backup routing paths for the nodes and the link schedule for the multiple nodes for the selected domain.

* * * * *